Aug. 31, 1965 H. K. FLESCH ETAL 3,204,086

DATA PROCESSING SYSTEMS

Filed April 27, 1961 10 Sheets-Sheet 1

INVENTORS.
HANS K. FLESCH
FREDRICK T. GUTMANN
ROBERT LIEBER

BY Robert Lieber
ATTORNEY

Aug. 31, 1965 H. K. FLESCH ET AL 3,204,086

DATA PROCESSING SYSTEMS

Filed April 27, 1961 10 Sheets-Sheet 2

INVENTORS.
HANS K. FLESCH
FREDRICK T. GUTMANN
BY ROBERT LIEBER

ATTORNEY

DATA PROCESSING SYSTEMS

Filed April 27, 1961 10 Sheets-Sheet 3

INVENTORS.
HANS K. FLESCH
FREDRICK T. GUTMANN
BY ROBERT LIEBER

ATTORNEY

DATA PROCESSING SYSTEMS

Filed April 27, 1961 10 Sheets-Sheet 4

INVENTORS.
HANS K. FLESCH
FREDRICK T. GUTMANN
BY ROBERT LIEBER

ATTORNEY

DATA PROCESSING SYSTEMS

INVENTORS.
HANS K. FLESCH
FREDRICK T. GUTMANN
BY ROBERT LIEBER

ATTORNEY

INVENTORS.
HANS K. FLESCH
FREDRICK T. GUTMANN
BY ROBERT LIEBER
ATTORNEY

INVENTORS.
HANS K. FLESCH
FREDRICK T. GUTMANN
BY ROBERT LIEBER

ATTORNEY

Aug. 31, 1965 H. K. FLESCH ETAL 3,204,086

DATA PROCESSING SYSTEMS

Filed April 27, 1961 10 Sheets-Sheet 8

INVENTORS.
HANS K. FLESCH
FREDRICK T. GUTMANN
BY ROBERT LIEBER

ATTORNEY

Aug. 31, 1965 H. K. FLESCH ETAL 3,204,086

DATA PROCESSING SYSTEMS

Filed April 27, 1961 10 Sheets-Sheet 9

INVENTORS.
HANS K. FLESCH
FREDRICK T. GUTMANN
BY ROBERT LIEBER

ATTORNEY

INVENTORS.
HANS K. FLESCH
FREDRICK T. GUTMANN
BY ROBERT LIEBER

ATTORNEY

United States Patent Office 3,204,086

Patented Aug. 31, 1965

3,204,086

DATA PROCESSING SYSTEMS

Hans K. Flesch, Glen Cove, N.Y., and Fredrick T. Gutmann, Caldwell, and Robert Lieber, West Orange, N.J., assignors to International Telephone and Telegraph Corporation, Nutley, N.J., a corporation of Maryland Filed Apr. 27, 1961, Ser. No. 106,090
16 Claims. (Cl. 235—61.9)

This invention relates generally to data processing systems, and particularly to such systems which require the posting, on selected display elements, of selectively grouped items of data relating to, or derived from, corresponding primary data elements. Although it is applicable to many data processing situations within the above definition, the invention was originally conceived and developed for use in connection with commercial checking account posting systems, wherein the primary elements are checks and deposit slips, and the selected display elements are account ledger sheets updated in accordance with debit and credit indications on one or more associated primary elements. The application of the invention to utility accounts, statistical surveys, and other large scale data processing operations, are too numerous to mention, and the adaptation of the presently disclosed apparatus thereto may be readily made by those skilled in the associated arts, without further experimentation or exercise of the inventive faculty, merely by reading the present disclosure.

As the above implies three basic procedures are generally associated with, and characteristic of, systems to which this invention may be applied. These are, respectively, a sorting procedure—wherein primary data elements are grouped in accordance with a common characteristic, in the present instance, the depositor's name, a selection procedure—wherein a display, or secondary element, a ledger sheet in the present instance, is associated with each group of primary elements, and a transfer posting procedure—wherein representations of intelligence symbols, derived, directly or indirectly, from the primary elements, are transferred to the associated secondary elements. These procedures are characteristically subject to three associated classes of errors which are respectively designated sorting, selection, and transfer posting errors. The nature of each of the first two classes of error is obvious from the designation. The last-mentioned class, transfer posting errors, may be further characterized in terms of direct and indirect transfer posting errors, the former involving mishandling of intelligence symbols during a transfer operation, and the latter relating to the omission, or mishandling of a primary element whereby no posting transfer is made, or whereby the primary element intelligence is posted to more than one secondary element. The present invention relates exclusively to the detection and correction of sorting, selection, and indirect transfer posting errors; apparatus for the detection and correction of direct transfer errors in association with the presently disclosed apparatus being shown and described in a co-pending patent application Serial No. 102,692, filed April 13, 1961, by K. J. Staller, and a system cooperatively employing the two error detection and correction systems, in a unique manner, and with improved efficiency being shown and discussed in a co-pending patent application Serial No. 125,769, filed July 21, 1961, by F. McKennett et al.

Considering the above classes of error individually, the prior art preventive or corrective approaches thereto have been as follows:

First, with respect to sorting errors, one prior art approach has been to place account number identifying symbols on the primary elements (checks and deposit slips) prior to the issuance of the elements to the depositor, or other party, executing the same, or to have the depositor place the identifying symbols thereon prior to the execution thereof. These "pre-placed markings" are subsequently used to efficiently group the elements of each depositor, by means of either automatic or manual operations, and thereby to reduce the possibility of sorting errors. The disadvantages, however, are that the pre-placement of identifying markings introduces an additional manual procedure, which is still subject to error, into the previously required operations. Further, the pre-placed markings are of no value after an undetected error has occurred, and therefore of no value with respect to indirect transfer errors. Also, the preplaced markings are subject to distortion, or obliteration where, as in the present instance, the primary elements are relatively fragile, frequently handled, objects.

Secondly, with respect to selection errors, the prior art approaches generally involve a comparison operation in which pre-placed account number identifying markings on the secondary display elements (ledger sheets) are compared to pre-placed identifying markings on the primary elements (checks, deposit slips), to determine a mis-association of the two. This is subject to the criticisms cited in the preceding paragraph, and requires additional apparatus, for sensing primary and secondary markings, for storing and comparing the sensed markings, as required, and for the control of system operations in accordance with the comparison results.

Finally, with respect to indirect transfer posting errors, the prior art approach is generally to provide for the tallying of transfer posting operations and primary elements, to determine whether a posting operation has been performed for each primary element. This, again, is costly in terms of auxiliary time consuming procedures and apparatus, and does not guarantee that each primary element will be involved in one, and only one, posting operation.

It is thus the primary object of this invention to provide a data processing system including provision for the efficient detection of sorting, selection, and indirect transfer posting errors, in a single auxiliary system operation.

Another object is to provide a data posting system which does not require preplacement of markings, and associated auxiliary manual operations, for the detection of sorting or selection errors.

Still another object is to provide a data posting system wherein primary elements are provided with correlating markings derived from secondary elements associated therewith in transfer posting operations.

Another object is to provide a data posting system wherein the disposition of any primary element, subsequent to a data posting operation, is determined in accordance with markings derived from a secondary element on which the primary element intelligence has been posted.

Yet another object is to provide, in a data posting system, an efficient and economical arrangement for conditioning a remote printing unit for the subsequent transfer of a correlating account number indication to a group of primary elements in accordance with account number signals derived from, and uniquely characteristic of, a secondary element on which data taken from said primary elements is to be posted.

These and other objects are achieved, in an exemplary arrangement disclosed herewith, by means of a correlating transfer unit which is readily adapted to, and operative in association with, commercially available posting transfer apparatus (e.g. accounting machines), to perform a correlating account number transfer operation by means of which all errors within the above classifications are discoverable during the ordinary course of business with no further manual, or other time-consuming auxiliary operations. The specific correlating transfer operation disclosed herein involves an auxiliary printing operation wherein a representation of account number signals derived automatically from a secondary posting element (e.g. a ledger sheet), is stored, and wherein an indication of the stored representation is later transferred to primary elements (e.g. checks, deposit slips), in association with manual or other operating procedures ordinarily required for posting data, taken from said primary elements, on said secondary element. As the primary elements are thereafter filed, during the ordinary course of business, errors may be readily detected in terms of discrepancies between the transferred account number indications on the primary elements, and indications on the selected file repository. It is again noted that the present account number transfer is a by-product of the associated posting operations and therefore requires no pre-placement of account number identifying markings on the primary elements, as well as the associated time consuming operations required for setting up such pre-placement. Thus, the cost of the present account number transfer may be somewhat offset by savings made in relation to hitherto required pre-placement operations. It is also noted that any indirect transfer posting error involving a failure to post, is accompanied by the absence of an account number transfer, this being also readily noticed during filing.

The foregoing, and other objects and features of the present invention may be more fully appreciated and understood from the following detailed description to be read in association with the accompanying drawings wherein.

Figure 7:
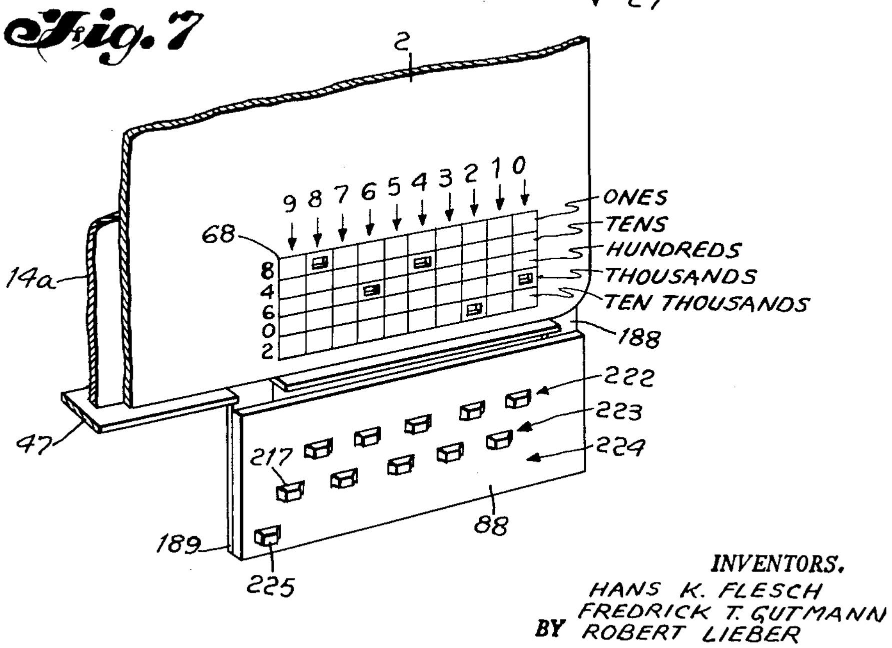
Figure 2:
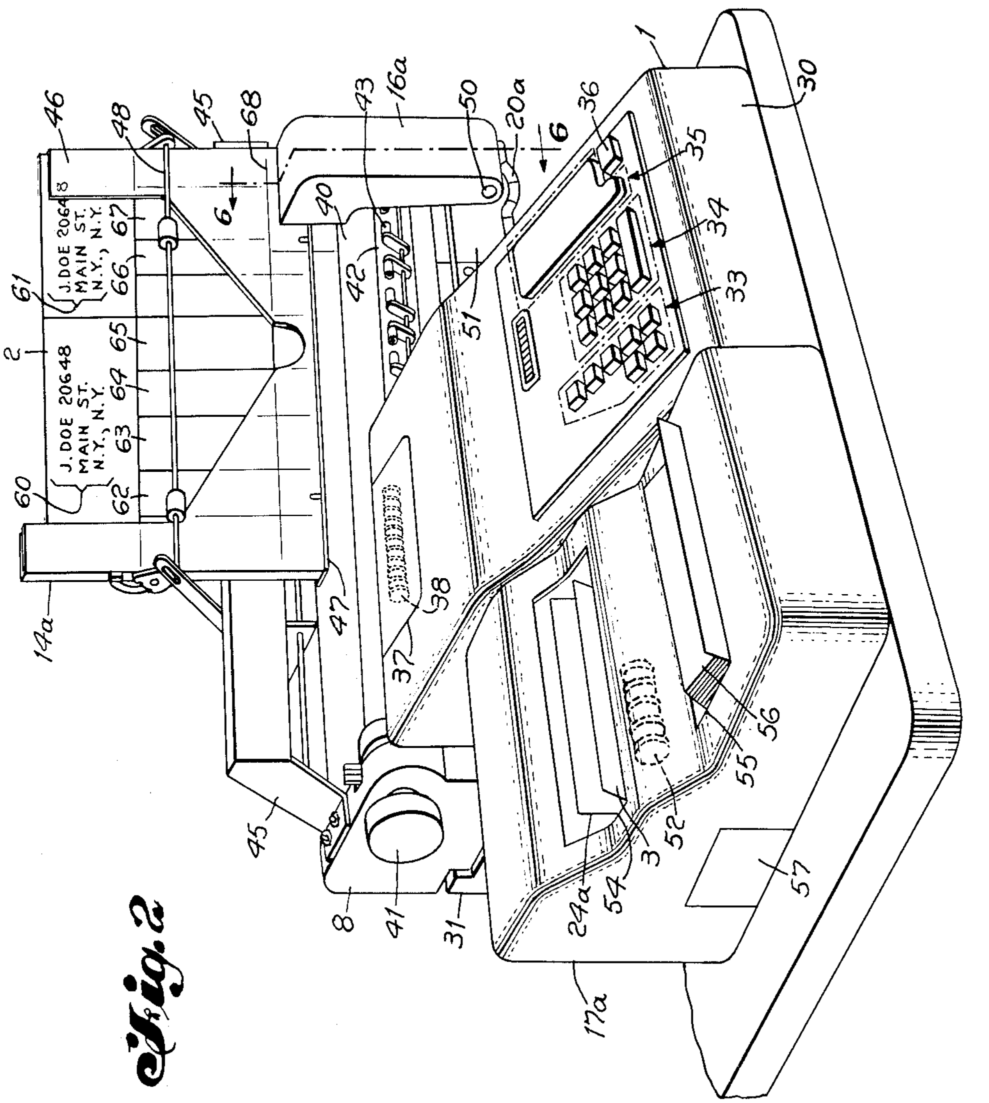
FIG. 2 is an isometric external view of a data processing and posting machine modified in accordance herewith.
Figure 3:
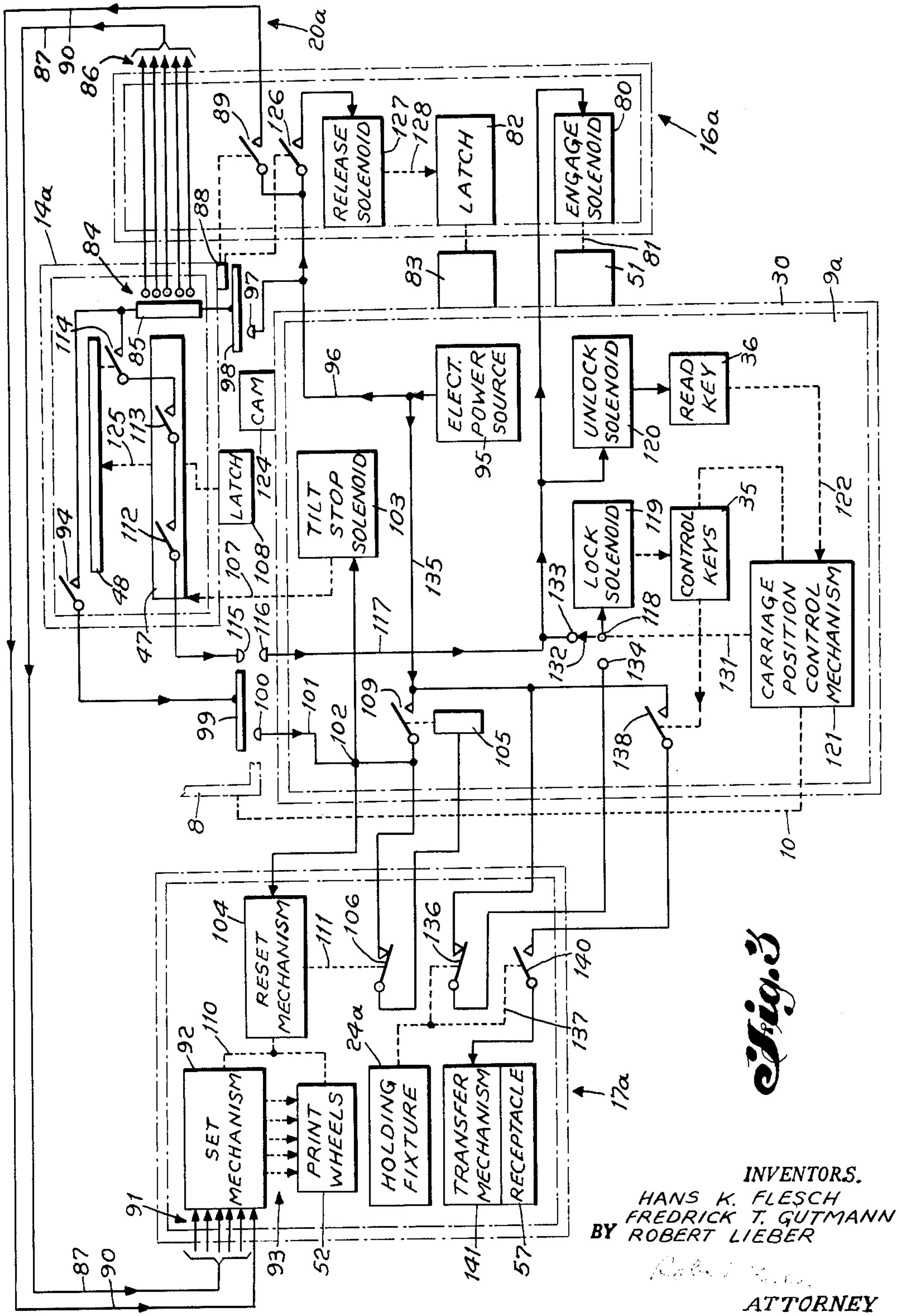
FIG. 3 is a schematic drawing illustrating the internal arrangement of components in the modified machine of FIG. 2.
Figures 4, 5:
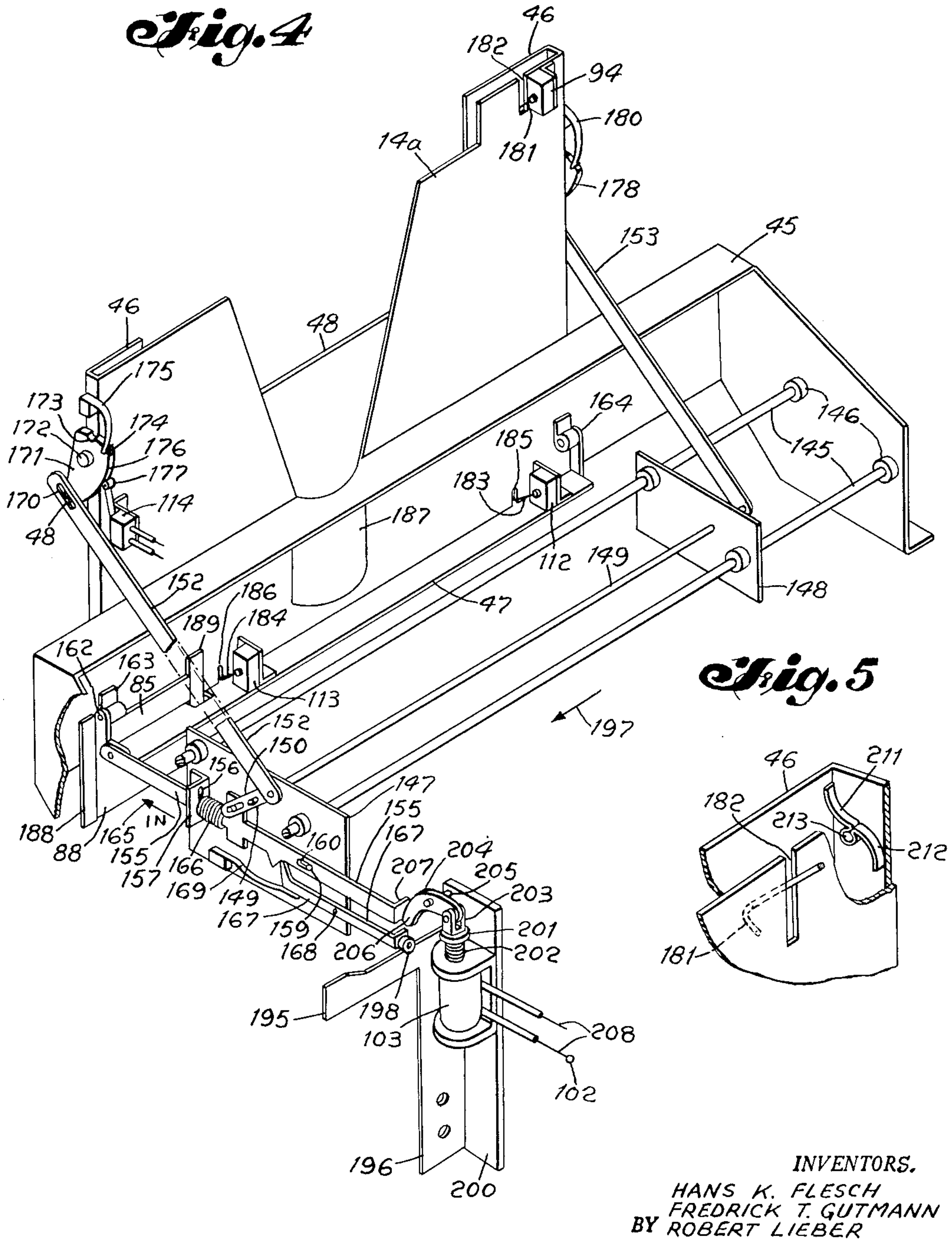
FIG. 4 is a rear isometric view of the holding fixture 14*a* of FIG. 2.
Figures 6, 8A, 8B:
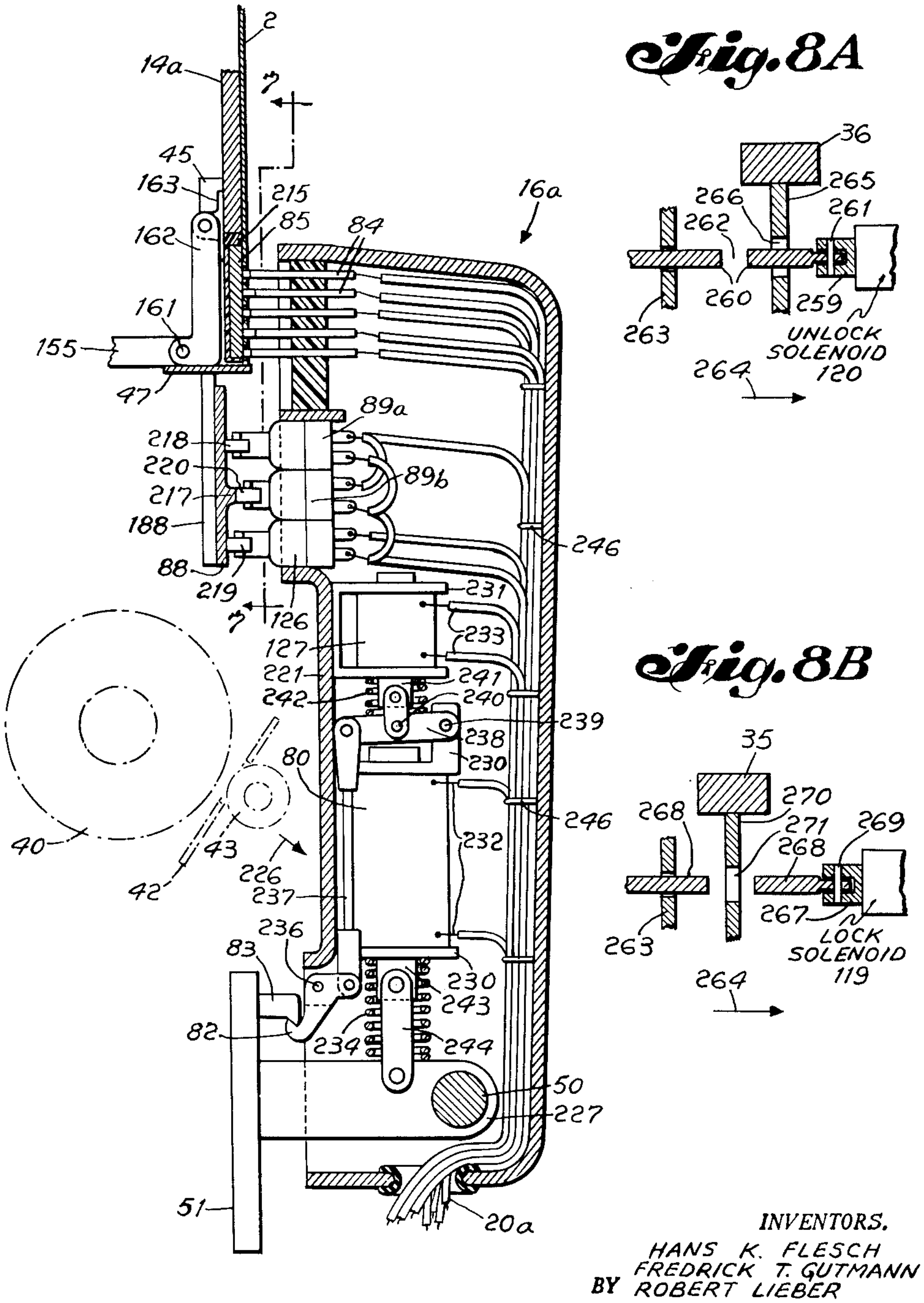
Figure 9:
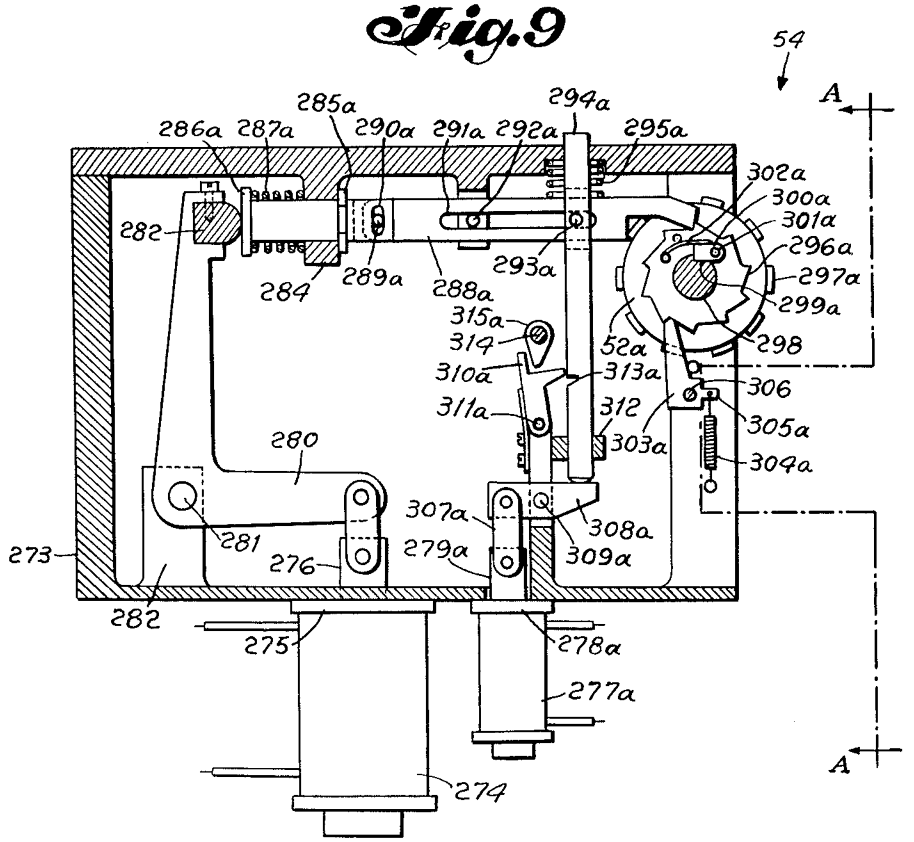
Figure 16:
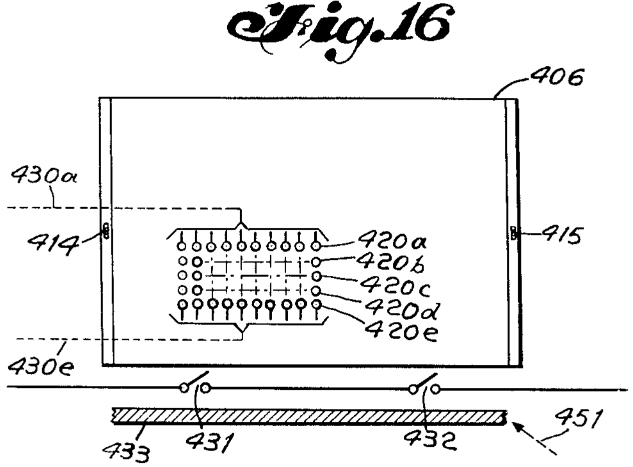
Figures 10, 11, 12:
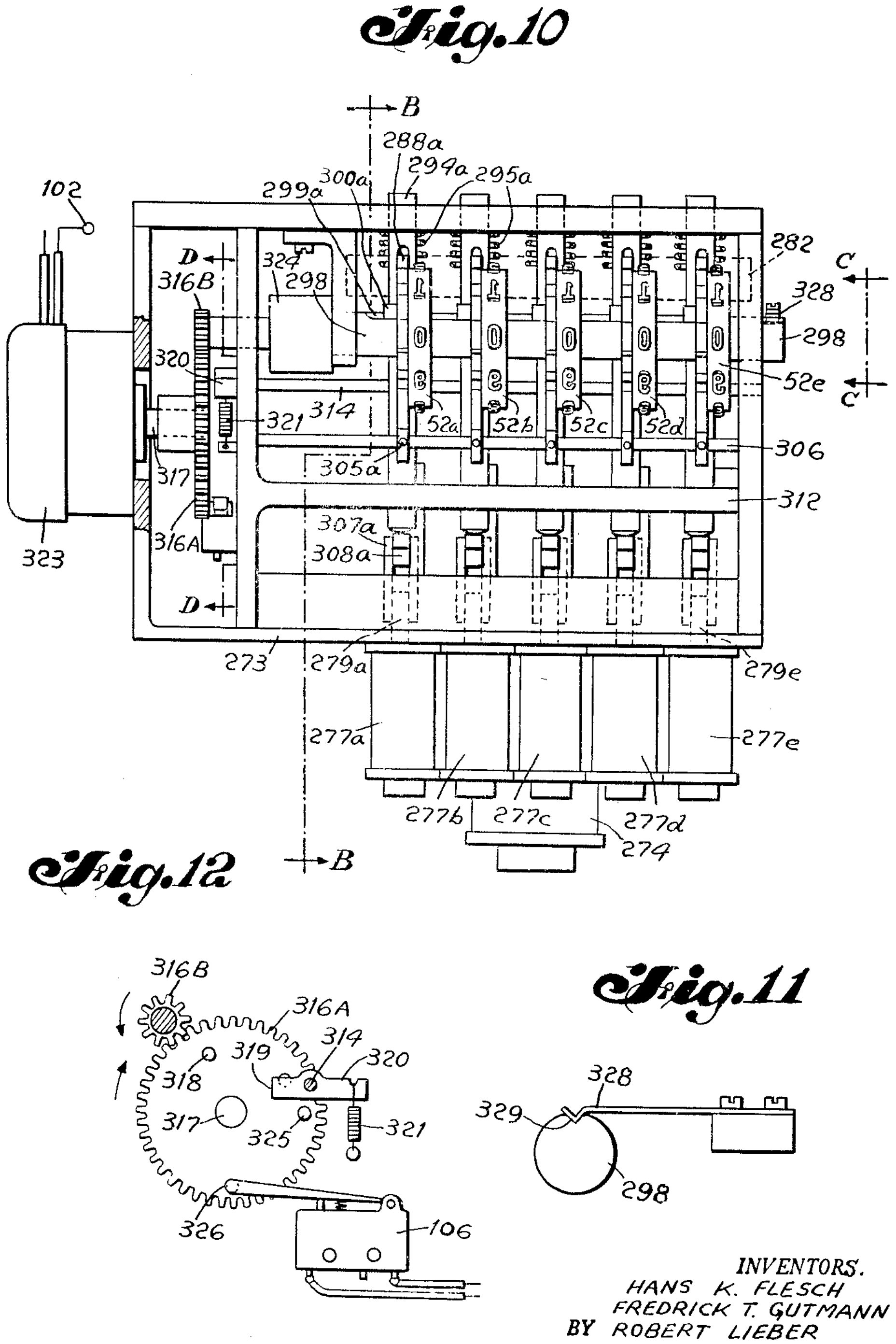
Figure 13:
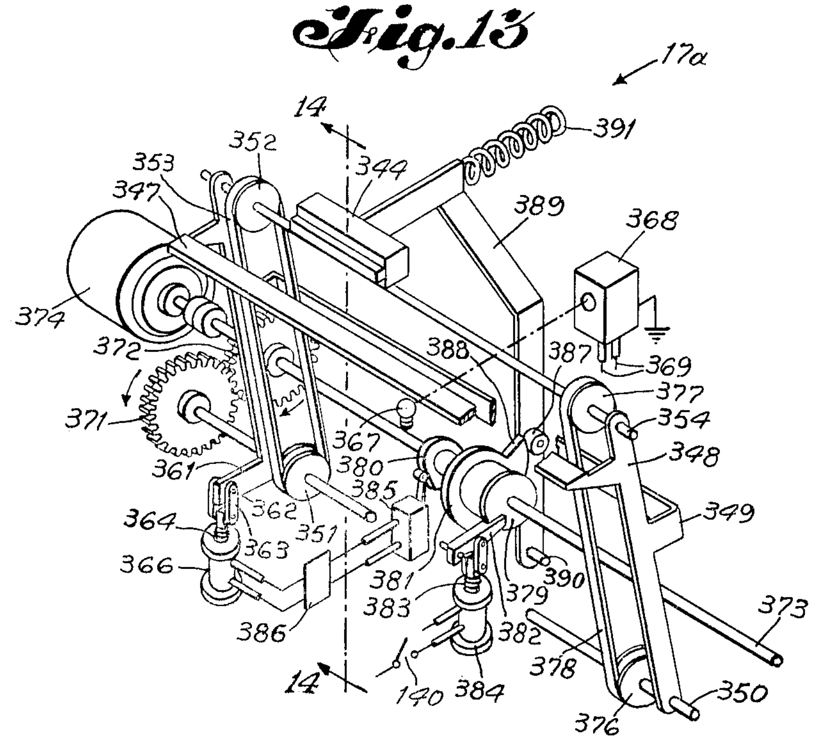
Figure 17:
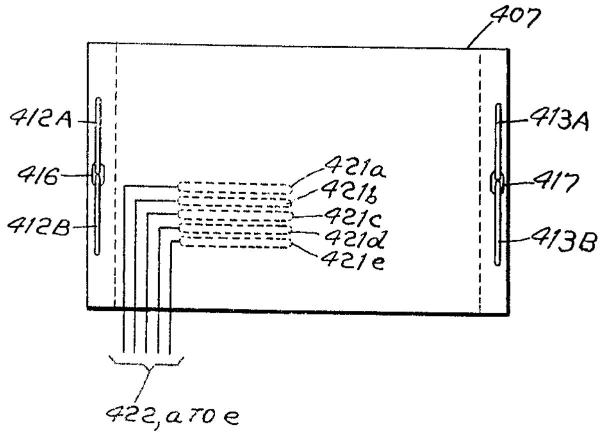
Figures 14, 18:
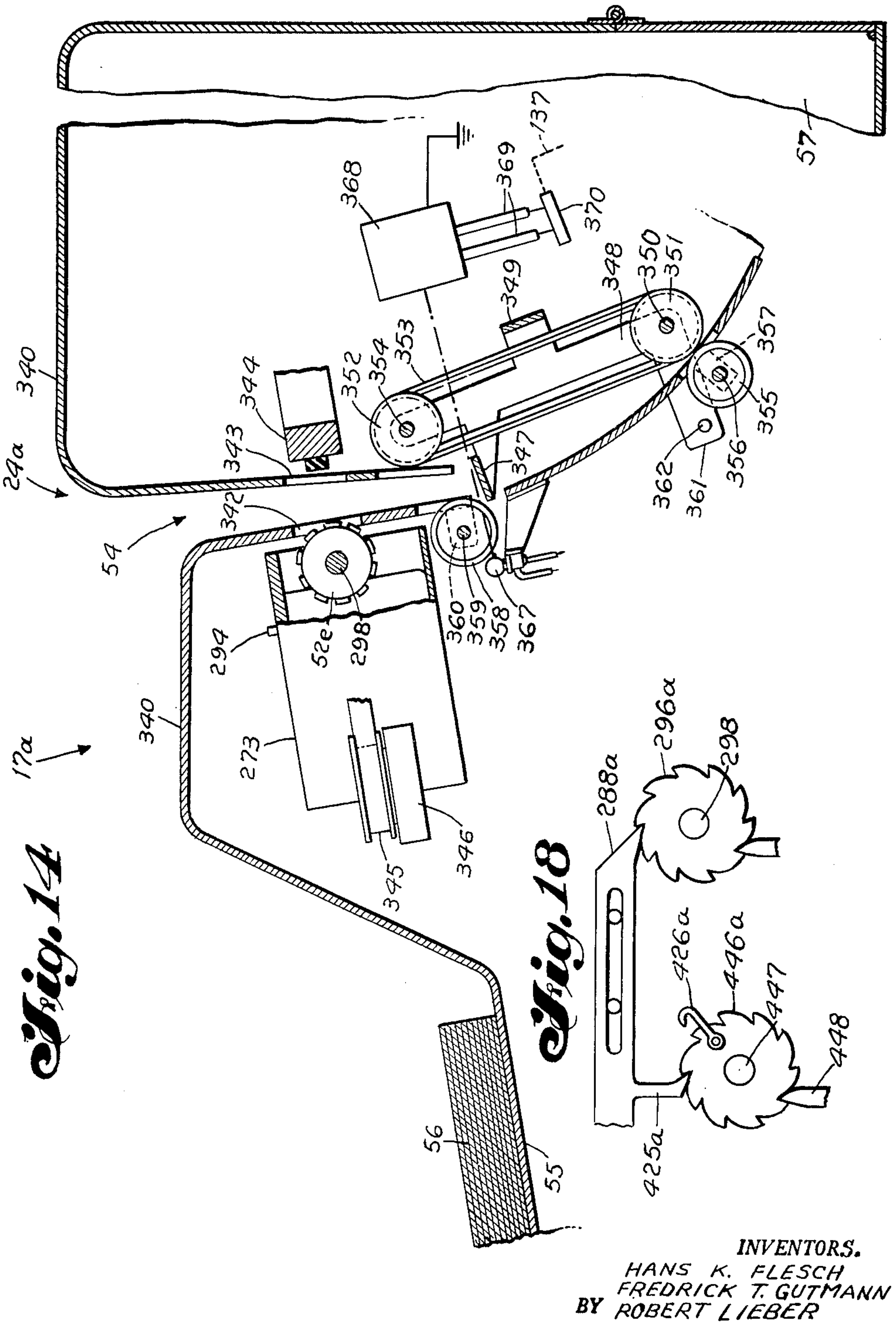
Figure 15:
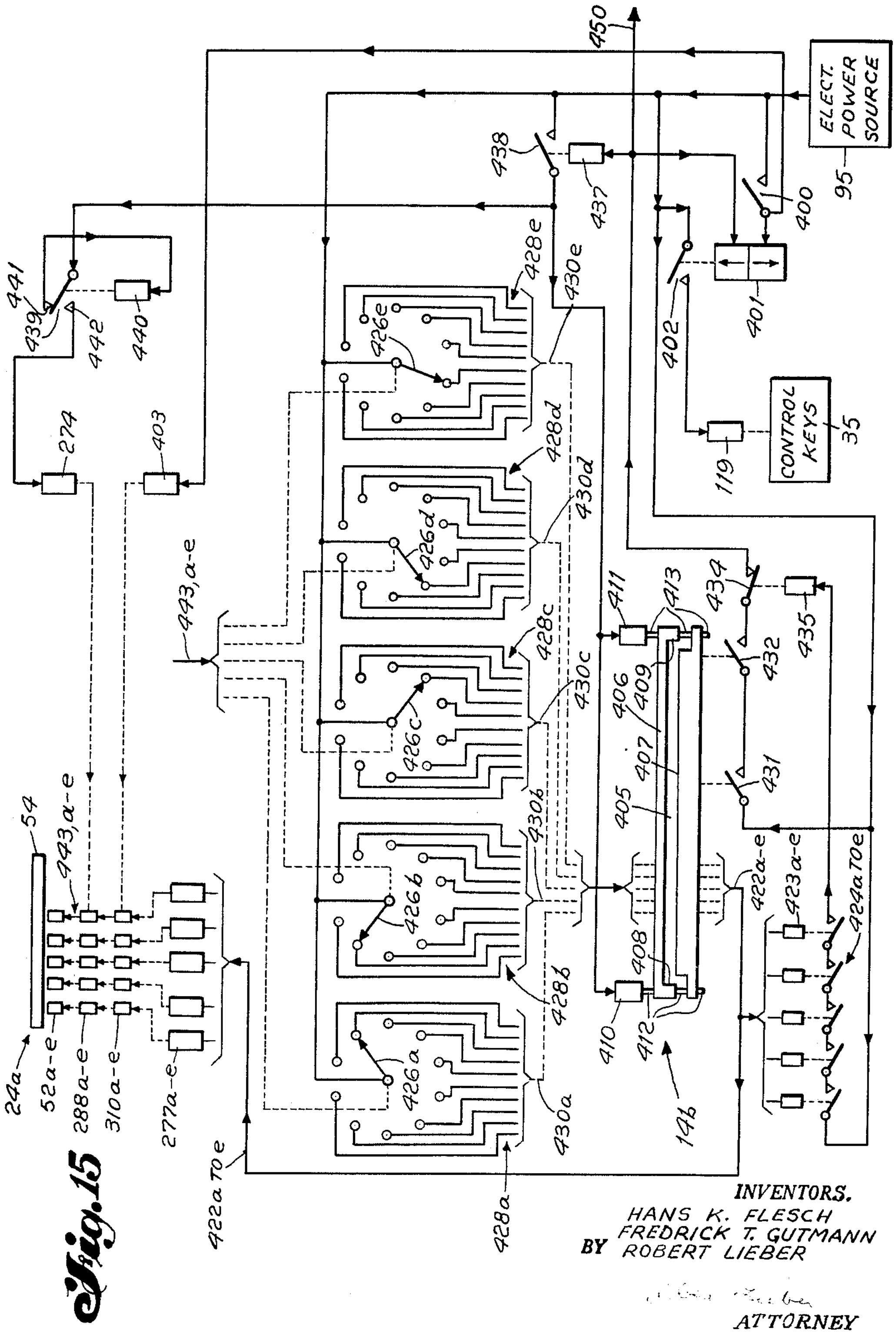

FIG. 5 is an isometric view of the upper left hand portion of the holding fixture cover 46 of FIG. 4, illustrating an optional arrangement of guide spring clips for bypassing the switch actuating arm 181 during removal of a ledger sheet from the holding fixture 14*a*;

FIG. 6 is a view in section through the sensing assembly 16*a* and holding fixture 14*a* of FIG. 2;

FIG. 7 is an isometric view of the cam plate 88, shown schematically in FIG. 3, in relation to the tilt stop assembly 47;

FIGS. 8A and B are respective views in section through read key 36 and a typical control key 35 illustrating the respective lock and unlock mechanisms associated therewith;

FIG. 9 is a view in section of a print wheel and associated setting and resetting mechanisms employed in the transfer assembly 17*a* of FIG. 2;

FIG. 10 is a view in elevation, with detent retaining pins shown in section, taken along line A—A of FIG. 9;

FIG. 11 is a view taken along line C—C of FIG. 10;

FIG. 12 is a view taken along line D—D of FIG. 10;

FIG. 13 is an isometric view of the printing and feed-off mechanisms in the transfer assembly of FIG. 2;

FIG. 14 is a partial view in section along line 14—14 of FIG. 13 illustrating further details of the mechanisms shown in FIG. 13;

FIG. 15 is a drawing partly schematic and partly in elevation of an alternative account number sensing arrangement in accordance with the present invention;

FIG. 16 is a view of the holding fixture backing plate in the arrangement of FIG. 15, including a section through the platform member used as a vertical support for ledger sheets inserted in the fixture;

FIG. 17 is a view of the holding fixture front plate in the arrangement of FIG. 15; and FIG. 18 is a view illustrating the coupling of pawls to switch and printwheel ratchets in accordance with the embodiment of FIG. 15.

Figure 1:
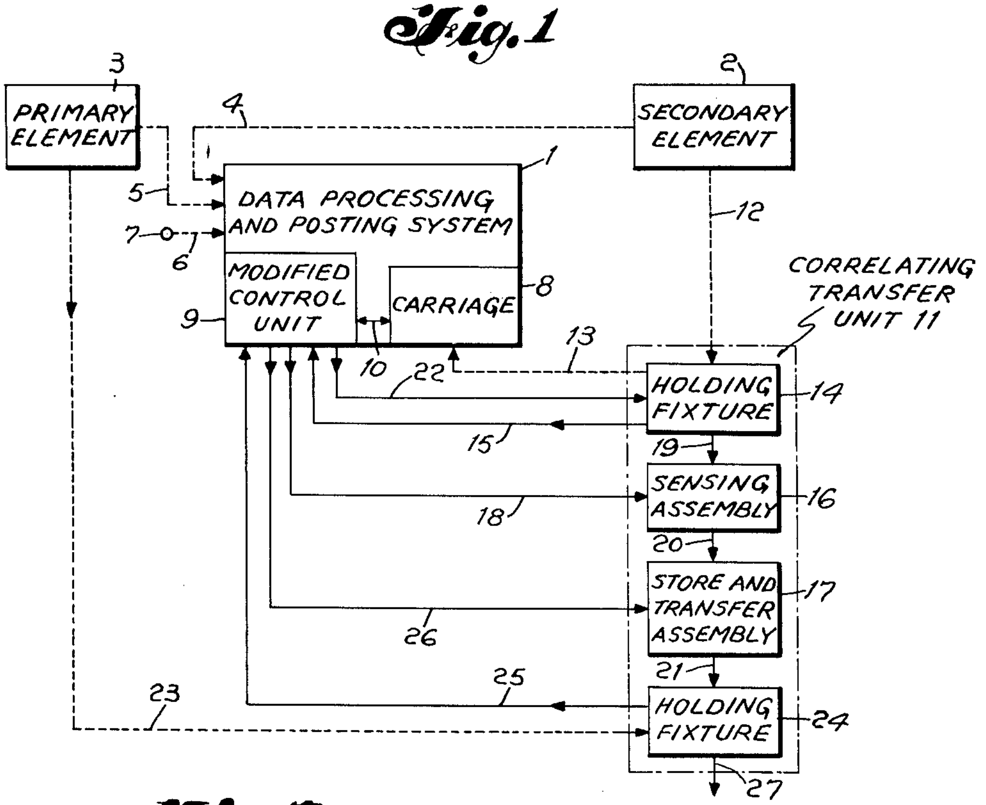
FIG. 1 is a block diagram useful in explaining the overall arrangement and operation of a system embodying the present invention.

Referring to FIG. 1, a bank accounting machine system, generally termed a data processing and posting machine system, including controls modified in accordance herewith, is generally designated by the numeral 1. System 1 is used to perform a posting operation in relation to bank checking accounts, and related accounting situations wherein balance information previously posted on a selected ledger card, or sheet, 2, generally termed a secondary element, is brought up to date in accordance with primary debit and credit intelligence taken respectively from associated checks and deposit slips, 3, generally termed primary elements. As indicated above, processing and posting systems of this type require the performance of associated sorting, selection and transfer posting operations which are subject to the corresponding errors associated with the present invention. Specifically, in the present instance, checks and deposit slips are grouped in accordance with the names of the associated makers or depositors prior to posting, corresponding account ledger sheets are selected for processing, and the primary debit and credit intelligence, for each group of checks and deposit slips belonging to the same account, is posted on the corresponding ledger sheet, while new balance information is accumulated, and thereafter posted on the same ledger sheet. This is schematically indicated in FIG. 1 by the dotted lines 4 and 5 which represent the transfer of old balance information and primary intelligence from the respective elements 2 and 3. A third dotted input line 6 from a general source schematically indicated at 7, is used to represent all other intelligence inputs to the system 1, such as the date of posting, the nature of the transaction, and the like. As indicated above, the present invention relates to grouping and selection errors, or equivalently, to non-correspondence errors in which primary intelligence is posted on a non-corresponding ledger sheet, and to indirect transfer posting errors where primary elements are fortuitously mishandled so that the information thereon is not posted at all. The novel approach herein is, in lieu of the prior art immediate detection, or prevention of the errors, to allow the errors to occur, and also to transfer an account number indication to each primary element, in association with the corresponding posting operation, whereby the disposition of the primary intelligence is made immediately apparent to all who subsequently examine the primary element during the ordinary course of business. Thus, the absence of such a transferred account number indication, or the presence of more than one such indication would be indicative of an indirect posting transfer error, while the presence of a transferred indication which differs from the account number indication on the file repository of the primary element selected e.g. in accordance with other information on the primary element, such as the depositor's name, is indicative of a non-correspondence error. As noted above, the present invention requires fewer auxiliary procedures and is therefore more efficient than prior art systems. It is further noted, and bankers have so indicated, that despite all prior art precautionary measures, non-correspondence errors can, and do, occur, and once such an error has occurred, it is usually not discovered until a disgruntled depositor reports an incorrect balance statement. Even then, a difficult and time consuming procedure is required to locate the account of the depositor benefiting from the error.

The present approach further includes the provision of interlock precautions by means of which the association of each primary element with one, and only one, secondary element, whether or not the secondary element is correctly associated therewith, is further ensured.

The above account number transfer and interlock precautions are also schematically indicated in FIG. 1 as noted below. The system 1 includes a carriage mechanism 8 the position of which is controlled and sensed by a control unit 9, as indicated by the connecting line 10, therebetween. Control unit 9 has been modified in accordance with the present invention in a manner to be described. In conventional operations, the ledger sheet 2 would be directly inserted into rollers on the carriage 8, and transported laterally in relation to a printing assembly, shown at 38 in FIG. 2, but, for convenience, not shown in FIG. 1, with the required posting intelligence being transferred via the printing assembly to selected positions on the ledger sheet, as required. In the present arrangement, this operation is preceded by a sensing operation wherein the secondary element 2 is first associated with a correlating account number transfer unit 11, as indicated by the dotted lines 12 and 13. The sheet 2 is inserted into a holding fixture 14 within the unit 11 and, when properly oriented in relation to this fixture, a "ready" signal is transferred from the fixture to the control unit 9, the signal transfer channel being schematically indicated at 15. When the "ready" signal is sensed, the control unit 9 actuates a sensing assembly, schematically indicated at 16, to sense coded account number markings which have been previously placed on the sheet 2, and to transfer signals representative thereof to a store and transfer assembly 17 which stores a representation of the transferred signals. The line of control between control unit 9 and sensing assembly 16 is shown at 18. The lines of communication, from holding fixture 14, to sensing assembly 16, to store and transfer assembly 17, are respectively indicated at 19 and 20. The output of assembly 17 which actually represents the positions of a set of printing wheels 52 as explained below in connection with FIG. 3 is schematically indicated at 21. When the storage operation of assembly 17 is completed, the control unit operates the holding fixture 14, the control link being indicated schematically at 22, releasing the ledger sheet 2 for insertion into conventional vertical line-feed rollers on carriage 8 in accordance with standard posting procedures.

During the subsequent posting procedure, another unconventional operation is provided herein. Specifically, whenever intelligence is taken from a primary element 3, the associated element 3 is inserted into a holding fixture 24 so as to communicate with the assembly 17. Interlock controls are provided, these being partially represented by the line 25, which prevent the posting of the intelligence taken from the primary element 3 until the primary element is properly situated in the fixture 24, and when the required posting transfer of primary data is made, the assembly 17 is simultaneously actuated, by means of a signal on line 26, to transfer account number markings, corresponding to the intelligence stored therein, to the element 3, and the element 3 is then either manually, or automatically, removed from the fixture 24, the removal being characterized by the dotted line 27.

Referring to FIGURE 2, the superficial attributes of the machine 1 and the associated correlating transfer unit 11 of this invention are indicated therein. The machine 1 includes a stationary base assembly 30, having an extending portion 31 which supports the carriage assembly 8 on a railing not shown, the carriage assembly 8 being thereby translatable in relation to the stationary assembly 30. The base assembly 30 includes a plurality of indexing members, or keys, 33 through 36. Keys 33 are used to introduce auxiliary intelligence such as the date, the nature of a transaction, and the like into the machine 1. Keys 34 are numerical indexing keys by means of which data is entered into the machine. The keys 35 are control keys by means of which the quantities, or other symbols, selected by the keys 33 and 34 are transferred into the machine. Key 36 is a read, or sensing key which is further considered below. Within the assembly 30, there are conventional storage and accumulating units, not shown, by means of which various arithmetical operations may be performed, on quantities which are selected by the keys 34 and transferred by the keys 35. Also included within the base assembly 30, and schematically indicated within the compartment 37 therein, is an assembly of print wheels 38 or printing bars, which are conditioned, in accordance with the selections made by the keys 33 and 34, when given ones of the keys 35 are depressed. The keys 35, in addition to transferring key-selected symbol representations, are also used to direct the lateral movement, and positioning, of the carriage assembly 8, in relation to the base assembly 30, so that the printing assembly 38 may be positioned opposite any desired region of the carriage, for purposes of printing the selected intelligence, or numerical totals derived therefrom, on the ledger sheet which, for this purpose, is held by a conventional line-feed roller indicated at 40. The roller 40 is manually operable to vertically position an inserted ledger sheet 2, in relation to the printing assembly 38. The ledger sheet 2 when positioned by the carriage roller 40 is inserted through a guide plate indicated at 42 which is normally included in such apparatus and which is movable into and out of contact with the roller 40. The guide plate 42 is provided with idler rollers 43 which oppose the roller 40, and thereby rotatably grip an inserted ledger sheet for vertical transportation thereof. It is clear in FIGURE 2, that in order to insert the ledger sheet 2 between the rollers 40 and 43, it is necessary to first insert the ledger sheet into a holding fixture 14*a* which is located immediately above the roller 40. The subscript "*a*" is used to indicate that a specific example, of the item generally designated 14 in FIG. 1, is under consideration. The holding fixture 14*a* is mounted, by means of the bracket 45, on the carriage 8, and includes a transparent front cover and lateral guide assembly 46 for positioning a ledger sheet laterally in relation to the sensing assembly 16*a* corresponding to assembly 16 shown generally in FIGURE 1. The fixture 14*a* is provided with a tilt-stop assembly 47 (FIGS. 2, 4, and 6), which is variably positionable, in relation to the fixture, in two associated positions, respectively termed the blocking, and non-blocking, positions thereof. In the blocking position, the assembly 47 is interposed in the vertical path of an inserted ledger sheet, so as to vertically position the ledger sheet in relation to the aforementioned sensing assembly 16*a*. In the non-blocking position, the assembly 47 is positioned so as not to interfere with the vertical insertion of a ledger sheet, thereby allowing the ledger sheet to be further inserted vertically between the rollers 40 and 43 of the carriage 8. The sensing assembly 16 is pivotally supported by means of a pivot pin 50, on a bracket extension 51 extending from the base assembly 30. The assembly 16*a* is normally positioned, or pivoted, away from the holding fixture 14*a*, in order to protect the sensing components therein, and also to prevent accidental operation of the sensing apparatus, and resultant malfunction of the machine, as modified in accordance herewith.

As indicated in FIGURE 2, the store and transfer assembly 17*a*, is provided with a separate housing containing a holding fixture 24*a* for receiving a primary element 3. Schematically indicated print wheels, 52, are provided, for transferring correlating account number markings to each primary element 3 inserted into a feed slot 54 in the fixture 24*a*. A tray, 55, is provided for holding the primary elements in a stack, 56, prior to the processing thereof, and a schematically indicated receptacle, 57, is provided, at the bottom of the assembly 17*a* for receiving the primary elements after the associated account number transfers have been made thereto. It is noted that receptacle 57 is readily detachable from assembly 17*a*.

A ledger sheet 2, is shown in the sensing position within the holding fixture 14*a*, awaiting sensing by sensing assembly 16*a*, the latter being also shown in the sensing position wherein it is tilted forward adjacent the ledger sheet 2. The ledger sheet 2 comprises a depositor's statement portion 60 and a record portion 61 which are provided with identifying information, as indicated, this information comprising the depositor's name, address, and associated account number which, in the illustrated situation, is the number 20648. The ledger sheet 2 is further subdivided into columns 62 through 67 inclusive, which respectively receive printed indications, during the posting operation, from the printing assembly 38, these indications respectively comprising a carried forward balance indication, debit indications, credit indications, new balance indications, analysis information (such as the date and nature of the transaction), and finally, in the last column 67, the new balance indication is repeated for use as part of the bank records. The ledger sheet is also provided with pre-placed markings, in the region 68 in the lower right hand corner thereof (FIGS. 2 and 7), which represent the account number, such as the number 20648. For the present arrangement, we prefer to use a set of markings comprising a punched hole field consisting of 5 punched holes each selectively placed in one of ten associated positions in a corresponding horizontal row in the region 68. With this arrangement, when the sensing assembly is positioned adjacent the inserted ledger sheet, and when the carriage assembly is moved to the right relative to the sensing assembly, the coded field of punched holes in the region 68 serves to establish electrical continuity between a conductive backing plate on the holding fixture, as described below, and five brushes in assembly **16*a*, thereby transmitting five signals which are selectively positioned, in time, in accordance with the associated account number digits. The apparatus by means of which the operations of the sensing assembly, the tilt-stop assembly, and the transfer assembly 17*a*, are accomplished in association with the indicated control keys, 35, is discussed below. For the present, it is noted that during the ordinary posting procedures, the ledger sheet 2 is vertically inserted through fixture 14*a*, between the rollers 40 and 43, to the line position at which posting entries are required to be made, and the desired entries are made, in the columns 62 through 67**, in association with the control keys, which control the carriage position and the transfer of the manually indexed intelligence, or tabulating keys specifically provided for moving the carriage, the transfer keys also controlling the associated balance accumulating operations whereby new balances are derived, stored, and posted.

Referring now to FIGURES 3–14, the correlating account number transfer operation of the present invention may be further understood with particular reference to the schematic drawing of FIGURE 3, in which the holding fixture **14*a*, the sensing assembly 16*a*, the base assembly 30, and the transfer assembly 17*a* are distinguished by double framed outlines. It is emphasized that the carriage assembly is the only assembly which is capable of translating with respect to the other assemblies, and the sensing assembly is capable only of pivoting with respect to the other assemblies. For purposes of reference, a portion of the carriage assembly 8 is shown in a "broken away," double-framed outline to the left of the holding fixture 14*a*. Within the stationary base 30, the only items required for an understanding of the present invention are those included within the modified control unit, 9*a*, previously considered in connection with FIGURE 1. Hence, all other items within assembly 30**, are presently omitted in order to simplify the present discussion.

Beginning with assembly **16*a*, and referring to FIGURES 3, 6, and 7, the mechanisms by means of which this assembly is actuated into its sensing, and retracted, positions are as follows. The sensing assembly includes an engage solenoid 80 which communicates, through a schematically indicated linkage 81, with a bracket extension, 51, of the base assembly, 30, in a manner to be described, whereby upon operation of the solenoid 80, the assembly 16*a* is rotated into the sensing position in which an account number code field, on a ledger sheet in fixture 14*a*, may be sensed. The assembly 16*a*, when so positioned, is held thus by means of a latch 82 which engages a latch strike 83. The sensing assembly further includes a set of five brushes indicated generally at 84 which, in the sensing position, are pressed against the ledger sheet in fixture 14*a*. The ledger sheet is backed by an electrically conductive plate 85 which serves to establish electrical continuity between the brushes 84 and a source of electricity 95, as discussed below, while the carriage assembly is translated in relation to the brushes. The brushes 84 are individually brought out in conductors 86, which are schematically combined into a single line, at 87, to simplify the drawing. The holding fixture 14*a* is also provided with a cam plate 88 (FIG. 7), having projections thereon which are used to actuate a normally open switch 89, so as to produce reference position signals, on a conductor 90, as the carriage assembly moves in relation to the sensing assembly, this being thereby indicative of the position of the ledger sheet code field in relation to the sensing assembly. The five conductors represented by line 87, and the single conductor 90 are coupled, as indicated at 91, to a set mechanism 92, included within the assembly 17*a*. Set mechanism 92 includes a set of five mechanisms having associated lines of action schematically indicated at 93. The pawl mechanisms operate in response to the reference signals on conductor 90 to displace five associated print wheels from predetermined reference positions thereof through angular position increments associated with the positions of intelligence symbols thereon, and the signals on the conductors 87 are applied to mechanisms, discussed below, so as to selectively disengage the pawl mechanisms from the associated print wheels 52, preventing further movement of the print wheels, in accordance with the account number digit signal sensed by an associated one of the brushes 84. In this manner then, the print wheels 52 are ultimately positioned so as to enable the subsequent transfer therefrom, of a representation of the account number code on the ledger sheet 2 in the holding fixture 14*a***.

The foregoing print wheel setting procedure is generally initiated when a ledger sheet is inserted into the holding fixture **14*a* against the tilt-stop assembly 47 which is, at the time, in the vertical blocking position as a result of operations discussed below. The ledger sheet is held by the clamping bar 48 which has been manually operated against the inserted ledger sheet. As a ledger sheet is inserted, normally open switch contacts 94 are closed by the ledger sheet. The switch 94 is so positioned in relation to the holding fixture 14*a* that when the ledger sheet is fully inserted against the tilt-stop assembly 47, the switch resumes its normally opened condition. In other words, in the indicated position, the switch is above the top of a fully inserted ledger sheet (see FIGURE 2). When switch 94 is closed, electrical continuity is established between a source of electrical power, indicated schematically at 95, and a number of actuating mechanisms discussed below. This continuity is established through a conductor 96, a sliding contact 97 extending from base 30, a conductive strip 98 on the carriage 8, the conductive backing plate 85, the switch 94, a conductive strip 99 on the carriage 8, a sliding contact 100 extending from the base assembly 30, and a conductor 101, terminated in a junction 102. The circuit elements actuated by the establishment of the aforementioned continuity are a tilt-stop solenoid 103, a resetting mechanism 104, and a relay 105, which is energized through the normally closed contacts of a switch 106. Switch 106 is controlled by the reset mechanism 104 in a manner to be described. The solenoid 103 is used to actuate the tilt-stop assembly 47 into its operated or blocking position as the ledger sheet passes the switch 94, the linkage between the solenoid and the assembly 47 being indicated schematically by the dotted line 107. When actuated into the blocking position, assembly 47 is engaged and held by a latch 108 located on the holding fixture 14*a*. The relay 105 includes a pair of normally open associated contacts indicated at 109** which when closed, establish continuity between the source 95 and the relay 105 whereby the relay 105 is self-held, this continuity being established through the aforementioned normally closed contacts 106 controlled by the mechanism 104.

As indicated by the dotted lines 110, the reset mechanism 104 is operatively associated with the setting mechanism 92 and the print wheels 52. When operated, the resetting mechanism 104 conditions the print wheels 52 to the abovementioned reference angular positions in preparation for a setting operation and also conditions the pawl mechanisms associated with the dotted lines 93 so that they engage with the associated print wheels as required for setting the print wheels. As indicated by the dotted line 111, during the operation of the reset mechanism, the normally closed switch contacts 106 are operated, specifically they are opened, so as to interrupt the continuity between electrical power source 95 and the self-held relay 105, thereby dropping out the relay contacts 109, and also thereby disconnecting the source 95 from the solenoid 103 and the mechanism 104.

Therefore, when a ledger sheet is inserted through the holding fixture 14*a*, the ledger sheet temporarily actuates a switch 94, as it proceeds from the top of the holding fixture to the tilt-stop assembly 47, operating the self-held relay 105 and the tilt-stop solenoid 103. The tilt-stop assembly is thereby brought into the blocking position so as to vertically retain the ledger sheet as it progresses downward through the holding fixture, and at the same time the resetting mechanism 104 is operated so as to condition the print wheels 52 and the associated setting mechanisms 92 to receive the signals which are to be sensed from the inserted ledger sheet. Finally, as the reset mechanism operation is completed, the switch 106 is operated, disabling relay 105, thereby terminating the resetting operation, and also thereby interrupting the energizing circuit to solenoid 103, the assembly 47 remaining held by the latch 108.

It is noted that the sensed account number, in the present instance is a five digit decimal number, and therefore the print wheels 52 each have ten discrete angular positions at which representations of the digit symbols 0 through 9 are located.

The ledger sheet at this time is in the position required for reading. In this position, the ledger sheet is resting against the actuating arms of two very sensitive switches, 112 and 113, having normally-open associated contacts. These switches are known as "feather touch" switches, and are preferably of the type designated E051–00D manufactured by Cherry Electronic Products Company, Island Park, Illinois, and the switch 94 is a similar switch of the type designated E51–00A, manufactured by the same company. These switches are of the type that are actuatable upon light contact, with a fairly rigid piece of paper or the equivalent.

When the ledger sheet is properly seated vertically, the clamping bar 48 is manually depressed against the ledger sheet so as to hold the ledger sheet firmly in the position required for sensing. The clamping bar is coupled to a set of normally open switch contacts 114 which are in series electrical circuit with the switches 112 and 113, and also with a pair of relatively translatable contacts 115 and 116 which are respectively situated on the carriage 8, and base 30. In the position shown, the contacts 115 and 116 are touching, so that if the switches 112, 113, and 114 are closed, electrical continuity is established, between a conductor 117 and the power source 95, through the conductor 96, sliding contact 97, conductive strip 98, conductive backing plate 85, the switches 112 to 114, and the contacts 115 and 116. When this occurs, a signal is delivered through a switch 118 which is normally in the position shown, to a lock solenoid 119, an unlock solenoid 120, and the engage solenoid 80, actuating all three solenoids. The lock solenoid serves to lock the control keys 35 so as to prevent the transfer of any intelligence into or out of the machine 1, thereby preventing movement of carriage 8 in relation to the sensing assembly 16*a*, thus preventing damage to the brushes 84, or accidental operation of the setting mechanisms 92. The unlock solenoid 120 releases read key 36 so as to allow an operator to depress this key and thereby initiate the carriage motion required for sensing and finally, the engage solenoid 80 performs its abovementioned function of moving the sensing assembly 16*a* into the position required for reading, the operation of the lock solenoid being provided in conjunction with this positioning so as to protect the assembly 16*a* from damage. The read key 36 is linked to mechanisms included within the carriage controls schematically indicated at 121, the linkage being schematically indicated by the dotted lines at 122. When depressed, the read key actuates the carriage position controls 121 so as to tabulate the carriage to the right in relation to the brushes 84, thereby providing the required account number transfer signals to the setting mechanisms indicated at 92. The linkage between the carriage 8 and the control mechanisms 121 is again designated 10. It is noted that all presently available data processing and posting systems include control mechanisms, of the type designated 121 herein, by means of which the carriage may not only be positioned to any desired position following the operation of a selected control key, but also by means of which the position of the carriage is sensed in terms of carriage actuated switch contacts which enable selection of successive carriage positions. An illustrative carriage control arrangement of this type is shown in an article in Design News, February 13, 1961, entitled "Rotating Drum Supersedes Linear Tabulator To Ease Program Changes," by C. O. Lubatti, editor. This article is cited merely to show that there are known carriage control arrangements, for programming carriage displacement sequences in a calculating machine which are also versatile switching arrangements of the type useful herein to generally establish variable switching conditions in accordance with the position of the tabulating carriage, as is required in the discussion below.

Hence, in review, when contacts 115 and 116 are touching, and a ledger sheet is properly positioned in fixture 14*a*, the control keys are locked in their unoperated positions, the sensing assembly 16*a* is engaged in the sensing position, and the read key is unlocked allowing the depression thereof, and thereby enabling the movement of the carriage through the required sensing displacement. During the sensing movement, as the carriage passes a predetermined position, a cam projection 124 on the base 30 strikes the latch 108, relasing the tilt-stop assembly 47 to its non-blocking position. The tilt-stop assembly is so linked with the clamping bar assembly, as indicated by the dotted lines 125, that as the tilt-stop assembly assumes its non-blocking position, the clamping bar is released to its retracted position, allowing the ledger sheet to fall between the carriage rollers 40 and 43 previously considered in connection with FIGURE 2.

In addition to the projections which actuate switch 89, cam plate 88 is provided with another projection which serves to actuate a switch 126, at approximately the time at which cam 124 strikes latch 108. Upon closure, switch 126 connects a release solenoid 127 to the source 95, operating the solenoid. The release solenoid 127 is linked by means of the solenoid plunger indicated schematically at 128 to the latch 82 by means of which the assembly 16*a* is held in the sensing position. Thus, when solenoid 127 is operated, the assembly 16*a* is released to its retracted position wherein the brushes 84 are pivoted out of contact with the ledger sheet 2, and the sensing operation is completed.

Following the sensing operation, the previously required conventional posting operations are performed. Namely, the ledger sheet is inserted to the appropriate vertical line position where new entries are to be made, and the carriage 8 and printing mechanism 38, of FIGURE 2, are suitably operated to perform the required transfers. In connection with the present invention, however, as each debit, or credit, transfer is made in the respective column positions, 63 or 64, of a ledger sheet, the carriage is so positioned as to operate a lever, not shown, within the control mechanism 121, this lever being linked, as indicated by the dotted lines 131, to the movable contact arm 132 of switch 118. Under these circumstances arm 132 is actuated counterclockwise into position against a stationary contact 134, connecting the control key lock solenoid 119 to source 95, through a series electrical circuit comprising a conductor 135 and a normally closed pair of switch contacts indicated at 136. In this condition, the lock solenoid is energized preventing operation of the associated control keys unless, and until, contacts 136 are opened. The contacts 136 are linked to an actuating photoelectric element within the holding fixture 24*a* so as to be operated when a primary element is suitably positioned therein, this then being the condition required for the release of the control keys 35. After a primary element has been so inserted into the fixture 24*a*, and a control key 35 has been selected, a set of contacts 138, which, as indicated by the schematic dotted lines 139, are coupled to the keys 35, is then closed. Also, a set of normally opened contacts 140, which are ganged with the lock solenoid circuit contacts 136, are closed in association with the opening of the contacts 136. It follows, that when a suitable control key 35 is selected under these conditions, continuity is established from source 95 through the conductor 135, and the switches 138 and 140, to the transfer mechanism indicated at 141, thereby actuating the transfer mechanism. This mechanism includes a printing hammer which, when actuated, presses the inserted primary element in the fixture 24*a* against the print wheels 52, causing the transfer, from an intermediate inked ribbon to the primary element, of a representation of the account number symbols stored in the print wheels during the previous setting operation. Mechanism 141 also includes a feeding mechanism which, following operation of the printing hammer, delivers the primary element which has been so processed to the receptacle 57 at the bottom of the assembly 17*a*. The receptacle 57 thereby serves to accumulate processed primary elements, preventing the inadvertent failure to process any of these elements, and also tending to prevent the multiple processing of a single element in connection with more than one ledger sheet.

Referring now to FIGURE 4, fixture 14*a* is suspended from the carriage bridging bracket 45, which is structurally strengthened by a pair of tie rods 145, seated in bushings 146 fitted into the bracket. The tie rods provide structural rigidity for the bracket 45, and also provide a mounting support for vertical bracket members 147 and 148 in which an actuator link shaft 149 is journalled. The actuator link shaft 149 is connected to lever arms 150 and 151, the latter being hidden from view behind vertical bracket 148. The arms 150 and 151 are respectively linked to upwardly directed lever arms 152 and 153, which function in a manner described below.

Lever arm 150, is linked at one end to the lever arm 152, and yoked, at the opposite end thereof, around a pin 154 which is connected to a push-rod 155. Push-rod 155 is slidably mounted in a vertically elongated hole 156 in a bracket 157 extending from bracket 147, and on a pin 159 extending from the bracket 147 through a hole 160 in the rod. The push-rod 155 is connected by means of a pin 161, to an L-shaped bracket 162, which is connected to the tilt-stop platform assembly 47. The bracket 162 is also pivotally connected to a pivot bracket 163, the other end of the tilt-stop assembly 47 being similarly pivotally suspended from a pivot bracket 164. In the illustration, the assembly 47 and push-rod 155 are extended to a maximum forward position in the direction indicated by arrow 165. In this position, the tilt-stop is in its so-called blocking position, wherein as previously stated, it extends beneath the holding fixture 14*a* providing a vertical support for an inserted ledger sheet, for purposes of sensing coded account number indicia thereon. The tilt-stop assembly is held in the indicated position, against the action of a compressed spring 166, by means of a latch arm 167, which engages a mating projection on the underside of the push-rod 155. Latch arm 167 is pivotally suspended from a pin 168 attached to the bracket member 147, and the push-rod engaging point on the latch is urged upwards by a flat spring 169, also attached to bracket 147. It may thus be appreciated that if latch 167 were rotated counter clockwise around latch pivot 168, rod 155 and tilt-stop 47 would be urged by spring 166 in the direction opposite to that indicated by arrow 165, and therefore, the tilt-stop assembly would be pivoted out of communication with the holding fixture 14*a*. The mechanisms required to operate the latch 167 and those required to push the push-rod in direction 165 are discussed below. Arms 152 and 153 are provided with holes 170 through which the clamping bar 48 projects, leaving the clamping bar free to rotate upwardly in a direction away from the holding fixture independently of the motion of the arms 152 and 153. In the position shown, the clamping bar is pressed against the holding fixture in the position required to clamp an inserted ledger sheet securely for sensing. From the linking connections shown, it may be appreciated that the clamping bar is forced away from the holding fixture when latch 167 is rotated so as to release the rod 155, the clamping bar being attached to an arm 171 pivotally mounted on a pin 172 extending from the fixture 14*a*, and also coupled, through lever 152, to rod 155. Arm 171 is fitted with notched detent recesses, 173 and 174, which engage a detent spring 175 so as to provide two bistable operating positions for the clamping bar, the recess 174 being associated with the illustrated position and the recess 173 with the retracted, or disengaged, position. The clamping bar arm 171 is also provided with a cam projection 176, which, in the position shown, operates actuating arm 177 of switch 114 previously considered in the discussion of FIGURE 3, closing the contacts thereof. The other end of the clamping bar, not visible in FIGURE 4, is attached to a clamping bar arm 178 pivotally mounted on a pin, not shown, which is connected to the holding fixture. The arm 178 also includes detent recesses which receive a detent spring 180 in correspondence with the action of recesses 173 and 174.

At the upper right hand corner, the switch 94, mounted on the back of cover 46, includes a sensitive actuating arm 181 projecting through one or more slits 182 in the cover. Similarly, switches 112 and 113, considered in connection with FIGURE 3, have sensitive actuating arms 183 and 184 projecting through respective openings 185 and 186 in the bracket 45. The bracket 45 is recessed, as indicated at 187 to facilitate the manual insertion and removal of ledger sheets with respect to the feed roller 40 of the carriage 8. At the left of bracket 45, the conductive backing plate 85 of the holding fixture is shown. Adjacent to plate 85 are strap extensions 188 and 189, preferably of sheet metal construction. Cam plate 88, described below, is attached to the straps 188 and 189, and includes projections for actuating switches 89 and 126 as considered in the discussion of FIG. 3.

Assembly 47 is operated to the non-blocking position as follows. From the position shown, the push-rod 155 is released by a counter clockwise rotation of the latching arm 167. This occurs when a cam projection 195, of a bracket 196, attached to the base 30, of machine 1, urges the end of the latching arm upward, as the carriage 8 moves laterally relative to base 30, during a sensing operation. The latching arm 167 is provided with an extending roller 198 which serves as a cam follower, riding along the upper surface of the cam 195, and thereby minimizing friction between the latch arm 167 and the cam 195 during the traverse of the carriage. The cam 195 is of a length such that when the carriage is at an extreme position in the direction 197, the roller 198 rests on the raised portion of cam 195. Assembly 47 is operated to the blocking position when tilt-stop solenoid 103, which is mounted on extension 200 of the base mounted bracket 196, is energized, the solenoid plunger being operated, in opposition to a spring 202, carrying with it a link 203 connected to a cam 204, which is pivoted on a pin 205, attached to the bracket extension 200. Cam 204 is provided with a cam projection 206 which contacts an extension 207 of push-rod 155 when the plunger of solenoid 103 is operated, pushing the push-rod in direction 165. For the sake of completeness, the actuating leads of solenoid 103 are indicated at 208, one of these leads being connected to the junction 102 considered in the discussion of FIGURE 3.

Referring to FIG. 5, to avoid a redundant operation of actuating arm 181 of switch 94 during removal of a ledger sheet from fixture 14*a*, a pair of spring clips 211 and 212—extending from, and attached to, a pin 213 connected to cover 46—may be used to define respective ledger insertion and removal paths, which respectively include and bypass, the arm 181 so that switch 94 is actuated only during insertion of a ledger sheet.

Referring to FIG. 6, the conducting plate 85 is shown as being isolated, by a border 215 of insulating material, from other portions of the holding fixture 14*a* and from the strap 188 suspended therefrom. The cam plate includes three rows of cam projections, a projection in the middle row being indicated at 217, the projections in the other two rows being obscured by extended switch actuating arms 218 and 219. The projection 217, is shown operating a switch actuating arm 220. The foregoing switch actuating arm 218 to 220 are coupled to respective switches 89*a*, 126 and 89*b*. The outputs of switches 89*a* and *b* are combined and correspond to the output of the single switch 89 discussed in connection with FIGURE 3, it being deemed expedient in this instance to provide two switches with staggered corresponding cam plate projections, so as to avoid the overlapping of output signals therefrom due to switch arm inertia. Switches 89*a* and *b*, and switch 126 are all attached to the housing 221, of the sensing assembly 16*a*, which is shown in the actuated position wherein the sensing brushes 84 are positioned adjacent a ledger sheet in fixture 14*a*, the actuating arms of the switches 89*a*, 89*b*, and 126 being simultaneously aligned with the corresponding rows of projections on the cam plate 88.

The details of the cam plate projections may be more fully appreciated from the isometric view in FIGURE 7 wherein two of the rows of "strobe," or reference timing cams, are indicated at 222 and 223 respectively, these communicating with the switches 89*a* and 89*b* respectively. A third row, indicated at 224, is provided with the single cam projection 225 which initiates the "end of reading" signal used to retract assembly 16*a*.

Referring again to FIG. 6, rollers 40 and 43 are indicated as being a relatively separable conventional arrangement. Roller 40 is a large driving roller, while roller 43 is a small driven roller which is pivotally movable in the direction indicated by arrow 226. Roller 43 is attached to a guide plate 42 which pivots therewith and serves to guide an inserted ledger sheet. From the view in FIGURE 6, it may be appreciated that if sensing assembly 16*a* is pivoted clockwise away from fixture 14*a* and if the tilt-stop assembly 47 is moved to the left, away from the bottom of the holding fixture, the ledger sheet 2 is free to fall vertically against the guide plate 42 for insertion between the rollers 40 and 43.

The pivoting of the sensing assembly 16*a* occurs as follows. Assembly 16*a* is mounted on a pin 50 journalled in a bracket 227, extending from base extension 51. The engage and release solenoids 80 and 127, which are used to respectively engage and retract the sensing assembly are respectively attached to brackets 230 and 231, extending from housing 221. For the sake of completeness, the energizing leads of these solenoids are respectively indicated at 232 and 233. A spring 234, interposed between the bottom of bracket 230 and the bracket extension 227, exerts a force tending to produce a clockwise movement of the assembly 16*a* and pin 50 relative to bracket 227. In the position shown, the sensing assembly is prevented from undergoing clockwise rotation by means of the latch 82, which is held by a latch strike 83 extending from the base bracket 51. The latch 82 is rotatably mounted on a pin 236, and rotatable relative thereto by means of a latch rod 237 which connects the right extremity of the latch to an arm 238 which is rotatably mounted on a pin 239 extending from the bracket 230. Pin 238 is coupled by means of a linkage indicated at 240 to the plunger arm 241 of release solenoid 127, which, when energized, exerts a force, in opposition to a spring 242 which tends to pivot arm 238 in a clockwise sense around the pin 239. When this occurs, rod 237 is displaced, rotating latch 82 around pin 236 in a counter clockwise sense, in opposition to the force exerted by a spring 242 disengaging the latch from the strike 83, and thereby allowing spring 234 to pivot the assembly 16*a* in the clockwise sense relative to bracket 227, retracting the assembly. Conversely, engage solenoid 80 is provided with a plunger 243 which is connected through a linking arm 244 to the bracket extension 227 of base extension bracket 51. When solenoid 80 is energized, a force is exerted on plunger 243. Plunger 243 being linked by arm 244 to the fixed bracket 227, and solenoid 80 being mounted on the rotatable assembly 16*a*, when the solenoid is actuated, it moves relative to the plunger 243 rotating the entire assembly 16*a* and thereby engaging latch 82 with latch strike 83. The input and output electrical conductors of assembly 16*a* are fed through the cable 20*a*, the cable connections being made at suitably located points within the housing 221. At these points, the remaining conductors of the cable are tied by means of tie wires indicated at 246.

Referring to FIGURES 8A and B, the details of the lock and unlock solenoid arrangements of FIG. 3, are illustrated in respective sections therein. The solenoid 120 is linked to a plunger arm 259, having a key plate 260 extending therefrom and connected thereto by means of a pin 261. The key plate 260 in the view of FIGURE 8 include two sections separated by an empty region 262, the section view having been taken through a keyway, or slot, occupying the region 262. The key plate is slidably supported in a bracket 263, and moves in the direction indicated by the arrow 264 when solenoid 120 is energized. The read key 36 includes a stem portion 265 having a key recess 266 through which the key plate 260 extends, preventing operation of the key 36, except when the region 262 is adjacent the recess 266, as when solenoid 120 is operated. In the latter instance, key 36 may be freely operated, with stem 265 passing freely through the slot 262 in the key plate 260.

Similarly, lock solenoid 119 includes a plunger 267 having an extending key plate 268 connected thereto by means of a pin 269, and slidably supported in an extension of bracket 263 so as to be able to move freely in direction 264 upon energization of solenoid 119. A typical control key shown at 35, includes a stem 270 extending downwardly therefrom. Both the stem 270 and the key plate 268 are provided with complementary key recesses, in the region 271, which enable the free vertical passage of the stem 270 in relation to the plate 268, when solenoid 119 is unenergized, stem 270 being otherwise locked by key plate 268.

Referring to FIGURES 9 to 12, in connection with the setting up of an account number representation in the print wheels 52 of the transfer assembly 17*a*, the details thereof are as follows. The five print wheels 52, individually identified by means of the associated letters *a, b, c, d,* and *e*, are enclosed within a housing 273, and mounted on a shaft, described below, journalled in the housing. The print wheels are set by means of a stepping solenoid 274, attached to mounting bracket 275, and including an associated plunger arm 276. Solenoid 274 is cooperatively associated with five latching solenoids 277, *a* to *e*, which are individually associated with the five print wheels 52, *a* to *e*. The solenoids 277, *a* to *e*, are individually attached to the housing 273 by means of respective mounting brackets 278, *a* to *e*, and have associated respective plunger arms 279, *a* to *e*. Arm 276, of solenoid 274, is linked to a rocker crank 280 which is journalled, by means of a pin 281, on a bracket 282 extending from housing 273. A plunger bar 282, shown in section in FIGURE 9, is attached to crank 280, and extends across the housing 273 parallel to the shaft on which the five print wheels are mounted. The width of the rocker crank 280 and the indicated attaching screw and fitting are such that the plunger bar 282 is securely held in parallel relationship to the print wheel shaft. The bar 282 abuts five plungers 283, *a* to *e*, which are used to position the respective print wheels 52, *a* to *e*, as described below. The plungers 283 are slidably seated in holes within a bracket 284, extending from housing 273. The plungers are fitted with end flanges 285 and 286, *a* to *e*, which limit the strokes of the associated plungers in relation to the bracket 284 in either direction of plunger travel. The plungers 283, are urged away from their associated print wheels by means of springs 287, *a* to *e*, interposed between the housing projection 284 and the respective plunger flanges 286, *a* to *e*, and the plungers are actuated towards the associated print wheels when rocker crank 280 is rotated, upon energization of stepping solenoid 274. The plungers 283 are linked to respective pawls 288, *a* to *e*, by means of pins 289, *a* to *e*, which are attached to the pawls and extend through respective holes 290, *a* to *e*, in the plungers. The pawls include respective horizontally extending slits 291, *a* to *e*, through which pins 292, *a* to *e*, and 293, *a* to *e*, are extended, these pins slidably supporting the respective pawls. Pins 292, *a* to *e*, are fastened to the housing 273, while pins 293, *a* to *e*, are fastened to vertical push rods 294, *a* to *e*, having vertical slots therein through which the associated pawls are free to move laterally and pivot vertically. The pawls are urged downward in these slots by means of springs 295, *a* to *e*. The function of the push-rods is further explained below. The pawls 288, *a* to *e*, engage respective ratchet wheels 296, *a* to *e*, which are attached to the respective print wheels 52, *a* to *e*. Each print wheel includes 10 uniformly distributed print projections, a print projection on the print wheel **52*a* being indicated at 297*a*. These projections are representations of the digits 0 through 9. The print ratchet wheel combinations are rotatably mounted on shaft 298 which includes respective notches, 299**, *a* to *e*, which engage reset ratchets 300, *a* to *e*, these being rotatably mounted, by means of respective pins 301, *a* to *e*, attached to the corresponding ratchet wheels 296, *a* to *e*. The reset ratchets are urged radially inwards towards the respective notches 299, *a* to *e*, by means of flat springs 302, *a* to *e*. During setting operations, the shaft 298 is held in a fixed position, the print wheel assemblies being rotated in the clockwise sense with respect thereto, by means of the pawls 288, *a* to *e*, associated therewith. As previously noted, the pawls are pushed towards the print wheels when solenoid 274 is operated, rotating rocker crank 280 relative to pivot pin 281 and thereby extending the plungers 283, *a* to *e*. As this is done, the corresponding ratchet wheels 296, *a* to *e*, are rotated through discrete clockwise angular displacements of $1/10$ of a revolution, the associated print wheel positions being such that a different decimal digit symbol projection 297 is directed towards feed slot 54, for each incremental movement Ratchet detents 303, *a* to *e*, which respectively engage the teeth of ratchet wheels 296, *a* to *e*, are used to maintain the discrete positions of the wheels, the ratchet 303 being urged in a clockwise direction by springs 304, *a* to *e*, attached to posts 305, *a* to *e*.

As previously stated, the pawls 288, *a* to *e*, are urged downward in their respective push-rod slots by springs 295, *a* to *e*, which also act on the push-rods 294, *a* to *e*, the force being transmitted through the respective pins 293, *a* to *e*. This force maintains the pawls in alignment with the periphery of the associated ratchet wheels 296 so that the ratchet wheels are operated during each horizontal thrust of the pawl. The push-rods 294, however, may be moved upward by means of corresponding rocker arm linkages 307, *a* to *e*, and associated rocker arms 308, *a* to *e*, which are pivotally mounted on pins 309, *a* to *e*, fastened to the housing 273. Thus, when any of the plungers 279, *a* to *e*, of solenoids 277, *a* to *e*, are pulled downward, the corresponding linkage 307 acts through the corresponding rocker arm 308 to displace the corresponding push-rod thereby exerting an upward force, through the corresponding pin 293, on the corresponding pawl, causing the pawl to pivot upward around the corresponding pin 292 which is fastened to the housing 273, the freedom for such pivotal motion being afforded by the corresponding vertical hole 290 at the end of the corresponding plunger 283. When pushed in the upward direction, push-rods 294, *a* to *e*, are individually engaged by latches 310, *a* to *e*, pivotally suspended by means of pins 311, *a* to *e*, from a projection 312, of the housing 273. As indicated, latch **310*a* mates with a notch 313*a* in the push rod 294*a*. When held in the upward position by a latch 310, the associated pawl is no longer aligned with the periphery of the associated ratchet wheel 296, and therefore cannot engage the teeth thereof. The associated print wheel is thereby fixed in the angular position immediately preceding the upward stroke of the push-rod, this being determined by the energization of the associated latching solenoid 277**.

Prior to a setting operation in which the stepping solenoids operate the print wheels in the clockwise sense (FIG. 9), all of the print wheels 52 are positioned at a reference, or reset position, so as to enable the setting thereof with a predetermined number of stepping signals. The establishment of the print wheels in the reset position is accomplished as follows, it being noted that the position indicated in FIGURE 9 is the desired reset position. Assuming that the print wheels have been set, and that it is desired to reset them in preparation for a new account number setting operation, a shaft 314 carrying a plurality of cams 315, *a* to *e*, is rotated though a small angular displacement by means of gears 316 which are all operated from a main shaft 317 indicated in FIGURE 10. Thus the cams, during the rotation of the main shaft 317 undergo small clockwise (FIG. 9) displacements, disengaging the associated latches 310, allowing the pawls to assume operative positions in alignment with the peripheries of the associated ratchet wheels 296. The gears 316 are so coupled to the shaft 298 as to rotate the shaft through exactly one revolution in association with the displacement of shaft 314.

The foregoing may be more clearly understood from the view in FIGURE 12. As indicated, a gear **316*a* on the main shaft 317 includes a projecting pin 318 attached thereto. This pin, during a clockwise rotation of shaft 317 strikes a projecting surface 319, on a shaft actuating attachment 320, which is attached to the latch release cam shaft 314, rotating the latch release cam shaft 314 counterclockwise, in opposition to the force of an opposing spring 321 (FIGURE 12), this corresponding to the clockwise sense in the view of FIGURE 9. When shaft actuator 320 is struck, the resultant movement of shaft 314 and the cams 315**, *a* to *e*, attached thereto, causes an outward movement of the associated latches 310 releasing the associated push-rods and pawls. Further, if shaft 317 is rotated through a 90° angular displacement, the print wheel shaft 298 is caused to rotate through a complete 360° displacement due to the coupling between the gear **316*a*, on shaft 317, and gear 316*b* coupled to shaft 298. Shaft 317 is rotated through a 90° displacement, and back, in association with the operation of a spring-biased 90° rotary solenoid indicated at 323, and shaft 298 is coupled to shaft 317 by means of the gears 316 and a free wheeling clutch 324 which provides unidirectional engagement thereto, for unidirectionally displacing shaft 298 through exactly one revolution, whereby the associated ratchet and print wheel mechanisms are restored to the associated reference positions. Referring again to FIGURE 9, shaft 298 picks up the ratchets 300**, *a* to *e*, during its 360° rotation, carrying with it the associated print and ratchet wheel assemblies until they are in the reference position of FIGURE 9. When shaft 317 has completed its 90° movement in the clockwise sense in FIGURE 12, it rotates back to its initial position through a 90° counterclockwise rotation, releasing the latch release cam shaft which is restored to an unoperated position by the spring 321, allowing the latches 310, *a* to *e*, to rest against the associated push rods.

One additional feature should be noted, in connection with the preceding discussion, relating to the 90° rotation of shaft 317. In addition to the pin 318, affixed to the large gear 316*a*, there is another pin 325, affixed to that gear, which strikes an actuating arm 326 of the switch 106, previously considered in connection with FIG. 3, opening the contacts of the switch, and thereby deenergizing the relay 105, through which actuating power to the 90° rotary solenoid 323 is maintained after a ledger sheet is inserted beyond the switch 94. Hence, pin 325 operates switch 106, deenergizing rotary solenoid 323, and thereby terminating the print wheel resetting operation and also deenergizing tilt-stop solenoid 103.

It should thus be understood that the over-all operation involves the actuation of rocker arm 280 to produce the individual stepping of the associated pawl members 288 and thereby to produce an associated stepping of those of the corresponding print wheels 52 which have not been disconnected from the pawls by means of the associated push rods 294, and latches 310. The operations of the rocker arm 280 and the push rods 294 are respectively controlled by the solenoid 274, and solenoids 279, *a* to *e*. Still further, the resetting operation, in review, involves the operation of a 90° rotary solenoid 323 coupled to a shaft 317 which is thereby rotated through 90°, carrying with it a gear 316*a*, having fastened thereto projecting pins 318 and 325. The pin 318 is used to strike a latch release cam shaft actuator which rotates a latch release cam shaft 314, releasing the latched push rods which were previously used to decouple the associated pawls 288, *a* to *e*, from their respective print wheels, and the extending pin 325 is used to open switch 106 at the end of the 90° movement of shaft 317 so as to disable relay 105 within control assembly 9*a*, thereby de-energizing the solenoids 323. Further, in rotating through its 90° displacement, shaft 317, through the coupling between the gears 316*a* and 316*b*, and that between gear 316*b* and free-wheeling clutch 324, unidirectionally rotates shaft 298 through a single revolution, positioning the print wheels 52 in their associated reference positions, as shown in FIGURE 9. In order to insure the stability and accuracy of the positioning of the reset shaft 298, an additional detent spring 328 is provided, as indicated in the view of FIGURE 11, the detent spring mating with a detent notch 329 in the shaft 298 to further stabilize the incremental positions thereof.

Referring now to FIGURES 13 and 14, details are shown of the actuating mechanisms which are used to transfer a stored account number representation, from print wheels 52 (FIGURE 9), to a check, or deposit slip, inserted into the slot 54, of assembly 17*a*. Referring first to FIGURE 14, in the sectional view therein, checks are initially arranged in a stack 56 on the tray 55 which is situated near the front of the assembly housing designated 340. Within feed slot 54, housing 340 includes respective opposed openings 342 and 343, through which the print wheels 52, and an opposed print hammer 344, communicate. An inked ribbon 345, shown in broken detail, is passed around the print wheels through the opening 342, so as to enable the transfer, of an inked impression of the selectable symbol indications on the five print wheels, to any paper interposed between the hammer 344 and the print wheels, when the hammer is actuated towards the print wheels. The ribbon 345 is transported by means of a conventional pulley assembly, part of which is indicated at 346.

A check or deposit slip inserted into the feed slot 54 is vertically supported on a platform 347, extending from a pivot frame assembly 348 which is more comprehensively illustrated in the isometric view of FIGURE 13. The assembly 348 comprises two side arms and a connecting bar 349, in addition to the connecting platform 347, the latter being conveniently termed a "stop shelf." The entire pivot frame assembly is rotatably mounted on a shaft 350 and is rotated relative thereto by means described below.

Referring again to FIGURE 14, a wheel 351, attached to shaft 350, rotates therewith, the wheel constituting a drive wheel which is coupled to a driven wheel 352, through a pulley belt linkage 353, which is preferably of the conventional type. The wheel 352 is mounted on a shaft 354, extending through, and attached to, the side arms of the pivot frame assembly 348. The belt 353 abuts the surface of a wheel 355, mounted on a shaft 356 which is journalled in a bracket 357, attached to the housing 340. The wheel 352 is so situated, in relation to frame 348, that if the frame were pivoted counterclockwise around the supporting shaft 350, wheel 352 would pass through a corresponding opening in the housing bringing belt 353 into contact with the periphery of an idler wheel 358 mounted on a shaft 359 journalled in a bracket 360 extending from the housing. Simultaneously, the platform extension 347 would be moved to the left in FIGURE 14 clearing the feed slot 54, so that an inserted check or deposit slip may be vertically grasped and transported, by the wheels 352, 358, 351 and 355, through the gap between the platform 347, and the shaft 354, into the receptacle 57. In order to pivot the pivot frame assembly around shaft 350, an extension of the pivot frame at 361 is coupled, by means of a pin 362, and a linkage 363, to a solenoid plunger 364 which is operated (FIGURE 13), by means of a solenoid 366. When solenoid 366 is energized, plunger 364 is displaced, rotating assembly 348 around shaft 350, and thereby bringing pulley belt 353 into contact with the idler wheel 358, while removing the obstructing platform 347 from beneath the feed slot 54, enabling the feeding of an inserted check or deposit slip into the storage receptacle 57 at the bottom of the housing. Solenoid 366 is energized as follows, referring to FIGURES 3, 13, and 14. When a check or deposit slip is inserted into the feed slot 54 with the obstructing platform 347 positioned as in FIGURE 14, the inserted element, when properly positioned, interrupts the communication between a source of light 367 and a light responsive photocell assembly 368, energizing the output leads 369 thereof. The output of the photocell assembly, on the leads 369, is applied to a relay 370 which is linked, as indicated by the dotted line 137, to the switch contacts 136 and 140 of FIGURE 3. Hence, when relay 370 is energized, contacts 136 and 140 are respectively opened and closed. As a safety measure, the supply of power to photocell assembly 368 is preferably so related to the electric current supply feeding light source 367 that failure of the light source prevents further operation of the relay 370, this condition distinguishing interruption of the light source from failure thereof. This not being essential to the present operation, and also well known as a safety measure in the switching arts, the details thereof have been omitted so as to simplify the present discussion. The output of relay 370 (opening of switch 136, and closure of switch 140 of FIGURE 3) is used in the following manner.

The shaft 350 is continuously driven by a gear 371, driven by a gear 372, attached to a shaft 373, which is continuously rotated by means of a motor 374. As indicated in FIGURE 13, a second pulley assembly is provided at the right side of the pivot frame assembly 348, the second pulley assembly comprising a pair of pulley wheels 376 and 377 respectively mounted on the shafts 350 and 354 and coupled by means of a drive belt 378. The wheel 376 is connected to the shaft 350 and rotatable therewith, while the wheel 377 is rotatably mounted on the shaft 354. It may thus be appreciated that the feeding of primary elements through the feed slot 54 into the storage receptacle 57 at the bottom of the housing 340 is accomplished by two pulley assemblies, more uniform feeding being thereby achieved.

A shaft carrying a clutch assembly 379, is rotatably supported on the continuously rotating shaft 373. The clutch assembly shaft includes a small cam extension 380 and a large cam 381 which rotate therewith. The assembly 379 is normally restrained by a dog projection 382 extending from a spring restrained solenoid plunger 383 which is pulled in by a solenoid 384 when the solenoid is energized. Solenoid 384 is energized when switch contacts 140 are closed during interruption of light continuity between source 367 and photocell 368 by an inserted check or deposit slip. The operation of the solenoid is therefore a pulsed operation resulting in disengagement of the dog and, therefore, rotation of assembly 379, until the light interruption ceases. As the clutch revolves, the shaft 378 and its associated cams 380 and 381, are rotated, cam 380 operating a switch 385, which is coupled to the solenoid 366 through the contacts of a relay 386, thereby feeding the light source interrupting element into the receptacle 57. The cam 380 is so arranged in relation to the cam 381 that as the clutch assembly 379 revolves in the clockwise sense, the cam 380 does not actuate the contact of the switch 385 until after a pin 387 has been released by the abutting projection 388, of the cam 381. Pin 387 is connected to a print hammer lever arm 389, which is rotatably mounted on a shaft 390, and to which the print hammer 344 is connected. Accordingly, when the pin 387 is released by cam projection 388, the spring 391 impels the hammer 344 towards the print wheels 52, thereby transferring a printed impression of the account number stored in the print wheels, to the inserted check or deposit slip, just prior to the movement of the pivot frame assembly.

In review, the overall operation (referring to FIGURE 3) involves the selection of a representation of a debit or credit amount from each processed primary element and the transfer thereof to both the machine accumulator and an associated ledger sheet. The propriety of this association is subsequently ascertainble by means of the present cross-correlation operation wherein both the primary intelligence transfer, and the account number transfer are prevented unless a primary element is correctly seated in fixture 24*a* (see switch 136 of FIGURE 3) and the transferred correlating account number indications permit visual verification of the identity of the ledger sheet to which the associated primary intelligence was transferred.

A number of general principles may now be considered in relation to the foregoing. In all of the foregoing, we have discussed a secondary transfer arrangement wherein stored secondary indications are transferred to the primary elements (checks and deposit slips), in association with the transfer of primary debit and credit amounts from the primary elements to associated secondary elements (account ledger sheets). We have shown that it is necessary, in order to carry out this operation, to so arrange the secondary account number indications on the secondary elements, that they may be sensed and stored prior to any posting operations involving the secondary elements. We have further shown that the stored account number secondary indications may be directly transferred, in the form of permanent visual indications, or the equivalent, to checks or deposit slips associated with the secondary element. While we have shown a storage arrangement wherein the intelligence is stored in terms of print wheel positions, and the resultant transfer to the primary elements is in the form of a printed indication, this should by no means be construed as a limitation on the present system. Any other arrangement for uniquely modifying the appearance or status of the primary elements so as to uniquely correlate them with the associated secondary elements, is considered equally applicable in the present instance. For example, it is permissible to automatically file the primary elements in accordance with the stored account number indications.

As for the sensing arrangement, we have shown a dynamic sensing arrangement wherein the carriages of commercially available posting machines are modified so as to enable the sensing of secondary account number indications, on a ledger sheet, by means of the relative lateral movement between the machine carriage and the stationary machine frame or base. Other techniques may be used to accomplish the same purpose. For example, there are a number of well known ledger positioning arrangements known as automatic vertical line finders, by means of which relative vertical motion is produced between the ledger sheet and the machine base during the insertion thereof between the machine rollers 40 and 43. Such line finders require the perforation of the left and right edges of the ledger sheet so as to enable the ledger sheet to be transported vertically, and also so as to indicate the proper line position at which the sheet is to be stopped for the successive posting operation. To use such an arrangement it is merely required to rotate the present punched field 28 on the ledger sheets and also to rotate the brushes within the read head assembly so as to provide the same relative movement between the code field and the brushes as in the previously described embodiment. In fact, with a vertical line finding arrangement, there is no necessity for additional timing or reference indexing devices and/or position indicating switches, since such signals are generally available from within the line finding apparatus as part of the ordinary operation thereof. Further, an automatic line finding arrangement would eliminate the necessity for the use of the tilt-stop platform assembly 33 and all other elements associated with the holding fixture 31 previously considered, since the positioning function of these elements is not required when the automatic line finding apparatus is used. An example of an automatic line finder, suitable for use in providing contemporaneous vertical positioning and sensing operations relative to a ledger sheet, is the optional automatic line finder attachment associated with the Monroe President Accounting Machine.

Alternatively, it is not necessary that there be any relative motion between the ledger sheet and the sensing apparatus, a static sensing arrangement being equally feasible and, in some cases, preferable. A static arrangement, suitable for this purpose, is disclosed in FIGURES 15 to 18, inclusive. Referring to FIGURE 15, it may be recalled that the control key members 35, previously considered in connection with FIGURE 1, were provided with an interlock solenoid operated mechanism. In the present static arrangement, we prefer to have the interlock solenoid 119 operate as follows. The control assembly 121 (of FIG. 3) responsive to the operation of the read key 36 and the control keys 35, and to the movement of the carriage 8 (FIG. 3) is used to pulse, or briefly actuate, a switch 400 during the final positioning of the carriage following the completion of a new balance printing operation; the final operation required during the previous posting. The final positioning movement, in the present instance, involves the positioning of the carriage to its furthermost right position with no intermediate stops as in the preceding embodiment. This then is the conventional carriage movement which is automatically provided on several commercially available accounting machines as part of the ordinary accounting operation cycle. Upon operation of switch 400, a bistable mechanism 401, which is preferably a latching relay, such as the series LL type manufactured by Filtors, Inc. is set in a first stable condition wherein an associated set of switch contacts 402 is closed, establishing continuity between power source 95 and lock solenoid 119, and thereby locking the control keys 35, preventing operation thereof. The operations required to reset the latching relay 401 so as to release the control keys are described below. For purposes of the present disclosure, it is noted that the feed slot 54 into which checks and deposit slips are inserted, and the associated transfer apparatus, 17*a*, by means of which an account number is printed out thereon, and also by means of which the inserted element is transported, are all substantially identical to the disclosed apparatus considered in the preceding discussion of FIGS. 9–14. Further, the setting of the print wheels is accomplished by means of the same pawl and ratchet members, the pawls being indicated at 288*a* to *e*, and the associated print wheels 52, *a* to *e*, are shown abutting the feed slot 54. The pawls 288 are actuated by the stepping solenoid 274 as in FIG. 9, the signals being derived differently in accordance with the present different sensing arrangement. One change relative to the previous setting arrangement should be noted. In the present embodiment, it is not necessary to reset the print wheels to any reference position. In other words, it is permissible to allow the print wheels to remain in whatever position they happen to be in at the time of initiation of a new setting operation, and merely to release the associated latches 310, *a* to *e*, which latch the push-rods 294, *a* to *e*, (shown in FIG. 9), thereby releasing both the push-rods and the associated pawls. For this, we provide an unlatch solenoid 403, which is connected to switch contacts 400, and energized upon closure thereof. With the control keys 35 locked and the pawls 288 released so as to engage with the respective print wheels 52, the system is in a "ready-to-read" condition, and a sensing operation is then required to release the control keys. In order to read, or to sense, the coded indicia on a ledger sheet, a holding fixture 14*b* is provided, to receive the ledger sheet for sensing. Referring to FIGS. 15 through 17, fixture 14*b* includes a slot 405, bounded by a front dielectric plate assembly 406 and a rear dielectric plate assembly 407. Plate 406 is provided with side projections, or extensions, 408 and 409, which provide lateral positioning guides for the insertion of a ledger sheet. A pair of solenoids 410 and 411, are mounted on brackets, not shown, in such a position as to enable the extension of respective solenoid plungers 412 and 413 through respective holes 414 and 415 (FIG. 16) in the front plate 406, and also through respective holes 416 and 417 (FIG. 17) in the rear plate. The plates 406 and 407 are separated by an associated pair of springs, not shown, so as to maintain a predetermined separation between the plates, when the solenoids 410 and 411 are energized. The plungers 412 and 413 are bifurcated into portions respectively designated A and B which are bent at the rear of plate 407 so as to enable a uniform application of force to the rear plate when the respective solenoids are operated to bring the rear plate into contact with the front plate. The front plate 406 is provided with a series of five rows of electrical contacts 420, *a* to *e* (FIG. 16), with ten contacts in each row. The contacts 420 extend slightly towards the interior of the slot 405. Opposite the rows 420 associated conductive strips 421, *a* to *e* (FIG. 17), are provided on the rear plate 407. It is repeated that the plates 406 and 407 are non-conductive plates, and it is noted that the conductive strips 421, *a* through *e*, are slightly recessed within the rear plate 407 so as to provide mating recesses for the projections 420, and additional gripping friction to retain an inserted ledger sheet in a fixed position, when the two plates are brought together by the solenoids. The strips 421 are located on the front of the rear plate 407 and are therefore shown in dotted outline, the view in FIG. 17 being taken from the rear. The strips 421 are connected to associated conductors designated 422, *a* to *e*, through suitable connections running through the rear of the plate 407 to the respective conductive strips. The leads are brought out to corresponding relays, 423, *a* to *e* (FIG. 15), and also to corresponding latching solenoids 277, *a* to *e*, which, as previously indicated in connection with FIGURE 9, are used to individually disengage the associated pawls 288, *a* to *e*, from the corresponding print wheels 52, *a* to *e*, when the desired position thereof has been attained. The relays 423 are provided with associated normally opened contacts 424, *a* to *e*, arranged in series circuit so as to transfer an electrical connection from source 95 only upon the coincident actuation of all of the relays. The pawls 288 are provided with associated attachments 425, *a* to *e* (FIG. 18), by means of which, in conjunction with each incremental movement of the associated print wheels, corresponding movements of movable switch contact arms 426, *a* to *e*, are derived, each arm being thus successively connectable to ten stationary contacts (corresponding to association print wheel positions). These stationary contacts are connected to conductors 428 which are accordingly arranged in five groups 428, *a* to *e*, of ten contacts each. The conductors of each group 428 are schematically represented by an associated dotted line 430, each of which is connected (FIG. 16) to an associated row of contacts 420 on plate 4 to 6.

Referring to FIGURES 15 and 16, when a ledger sheet is fully inserted into slot 405, two sets of switch contacts, respectively located at the lower left and right corners of the fixture 14*b*, are actuated. These switches are indicated at 431 and 432, respectively. The ledger sheet is inserted against a platform 433 which may either be a simple flange extension from the main housing of fixture 14*b*, or a set of pins projecting therefrom, or any other suitable vertical interruption member. Upon closure of the contacts of switches 431 and 432, which are preferably of the feather touch type previously discussed in connection with the platform assembly 47 of FIGURE 3, continuity is established between source 95 and latching relay 401, the latching relay being thereby reset in the condition wherein switch contacts 402 are opened. The electrical path between source 95 and relay 401, includes a normally closed pair of contacts 434 of a relay 435. Relay 435 is operated only when all five of the contacts 424, *a* to *e*, are closed. Thus, when the ledger sheet is properly seated in fixture 14*b*, switch contacts 402 are interrupted, unlocking the control keys 35. Simultaneously, electrical continuity is established between source 95 and the operating coil of a relay 437, through the switches 431, 432, and 434, closing associated relay contacts 438. When contacts 438 close, continuity is established between source 95 and the solenoids 410, actuating the associated plunger arms 412 and 413, to press the plate 407 against plate 406, thereby establishing continuity, through the inserted ledger sheet, beween a selected contact in each of the rows 420, and the opposing conductive strips 421. As a result, an electrical circuit path is established between a selected conductor in each of the groups 428, *a* to *e*, and the associated one of the solenoids 423, *a* to *e*, and solenoids 277, *a* to *e*.

Also, when contacts 438 close, source 95 is coupled to movable contact 439 of relay 440, the movable contact being spring restrained in the indicated position against a stationary "self-interrupt" contact 441 through which the relay is excited, moving contact 439 into contact with the stationary contact 442. Contact 442 is connected to the step solenoid 274, which serves to operate the pawls 288, *a* to *e*, through their respective strokes, the coupling between the pawls and the print wheels 52 being indicated schematically by dotted lines 443, *a* to *e*, which are also coupled to the respective movable contact arms 426, *a* to *e*, of the ten-position switch assemblies coupled to plate 406.

In operation therefore "self-interrupt" relay 440 supplies pulses to solenoid 274 advancing the pawls 288 which individually advance the associated print wheels 52 and the associated movable arms 426 (see FIGS. 15 and 18). The arms 426 successively connect source 95 to the associated conductors 428, and, when the conductor corresponding to the punched hole on the ledger sheet, is contacted by the associated arm 426, the associated solenoids 423 and 277 are excited, the latter solenoid operating a push-rod 274, not shown herein (but described in FIG. 9) which is held by an associated latch 310, which thus disengages the pawl 288 from both the associated contact arm 426, and the associated print wheel 52. This is partially illustrated in FIG. 18 wherein the pawl 288*a* is seen to engage not only the detented ratchet wheel 296*a*, but also a ratchet wheel 446, rotatably mounted on a stationary shaft 447, preferably parallel to shaft 298, and detented by a detent 448. The wheels 446 and shaft 447 are both conductive, the latter being directly connected to source 95, considered in FIG. 3, while the former is provided with an extending brush 426*a* representing the contact arm 426*a*.

Thus, the print wheels 52 are ultimately positioned in accordance with the corresponding account number digit. It is noted that since the present arrangement is a static sensing arrangement, the coded field may be distributed all over the ledger sheet, this being in fact a somewhat beneficial condition since it is also desirable to maintain maximal separation between the contacts 420 and also between the conductive strips 421, so as to prevent undesired capacitive coupling between translating conductors.

Finally, it is noted that no reset mechanism is required in relation to the print wheels. Prior to each setting operation, as switch 400 is closed, solenoid 403 is actuated to disengage the latches 310, *a* to *e*; no other mechanical resetting movement being required.

Thus far, the exact location of fixture 14*b* has not been specified. In practicing this invention, we prefer to place the fixture as close as possible to the stationary contacts scanned by the arms 426 so as to minimize the amount of wiring required and the relative capacitance therebetween. However, if desired, the slot 405 may be remotely positioned immediately over the carriage rollers 40 and 43 (FIG. 2) by means of a bracket extending, not from the carriage, but from the stationary base of the machine, and following the sensing operation, the obstructing platform 433 may be automatically displaced, the ledger sheet thus falling vertically between the rollers 40 and 43, through the slot 405. For this it is sufficient to provide the platform 433 in the form of either a movable bar which extends entirely underneath the slot 405 or in the form of a pair of pins which project underneath and across the slot beneath the front and rear plates 406 and 407. In the latter instance, the pins may be withdrawn from the path of the ledger sheet by having the pins form part of corresponding solenoid plungers, and by actuating the plungers and latching the pins when it is required to withdraw them. Conversely, when it is required to insert the pins, it is sufficient to unlatch the the aforementioned plungers. The latching operation should, of course, be performed when the reading operation is certain to be completed. That is, when the ledger sheet is engaged by the front and rear plates, as indicated by the presence of a signal on conductor 450 in FIGURE 15, the platform or the pins may be withdrawn. On the other hand, when the prior posting operation has been completed, as indicated by the closure of switch contacts 400, it is desirable to extend the platform or pins 433 so as to provide a mounting base for sensing the ledger sheet coded fields. The arrangement of FIGS. 15 to 18 affords a number of advantages over the previously considered arrangements. First, no intermediate carriage movements are required, the sensing time being thereby decreased. Secondly, elimination of the relative movement between the sensing mechanism and the ledger sheet reduces the possibility of wear and tear on the sensing apparatus, the indicated conductive contacts on the front plate 406 being more rugged in structure than the brushes 84. Finally, if the slot 405 is positioned directly over the carriage, a still further decrease in the time required for sensing is achieved since the ledger sheet is inserted, sensed, and immediately thereafter directly dropped into the carriage rollers. Further, the elimination of the previously required resetting operation wherein the print wheels 52 are reset to reference positions provides an additional time saving feature, and an additional economy in terms of hardware. Should it be found objectionable to provide 50 conductive leads as represented by the leads 430, it may be convenient, if the slot 405 is remote from the scanning assemblies associated with contact arms 426, to utilize an alternative code arrangement wherein an 8–4–2–1 four digit binary code is used to represent each digit of the code, 20 wires then sufficing to transmit the five account number digits, with a code conversion unit employed adjacent the scanning assemblies to provide a conventional translation of the four wire code signal combination to a one of ten wire signal selection.

As a final remark, it is noted that while the systems thus far analyzed are comprised to straightforward relay and punched hole sensing elements, it should of course be appreciated that the indicated elements have many full equivalents in terms of newly developed and also old switching components, and it is believed that no mention need be made of these equivalents since they are obvious to all of reasonable skill in the art. It is further believed that it is fairly obvious that punched hole sensing apparatus is the full system equivalent of magnetic code sensors employing representations placed on magnetic media and sensed by magnetically responsive elements. In the latter instance, magnetic ink, for example, may be used to provide account number symbol, or code, representations on the ledger sheets and magnetic sensors may be coupled thereto, with a resultant transfer of magnetic continuity, as distinguished from the indicated transfer of electrical continuity. It is believed that in this instance also, no further explanation or mention of the full equivalents is required in view of their obviousness.

While we have described above the principles of our invention in connection with specific apparatus, it is to be clearly understood that this description is made only by way of example and not as a limitation to the scope of our invention as set forth in the objects thereof and in the accompanying claims.

We claim:

1. A data processing system comprising means for posting, on a selected secondary element, a primary data representation derived from a selected primary element, means associated with said positing means for deriving and storing a secondary representation corresponding to account number identifying indicia on said selected secondary element, and means operatively associated with said posting and said deriving and storing means for transferring an indication of said stored representation to said selected primary element in association with said primary data posting.

2. A data processing system according to claim 1 wherein said posting means includes means for transferring primary intelligence indications, and means for variably displacing said secondary element to variably position said transferred intelligence indications thereon and wherein said deriving and storing means includes secondary element holding means mounted on said variably displacing means, sensing means, and means coupled to said variably displacing means for inducing a predetermined relative movement between said secondary element holding means and said sensing means in association with the insertion of said secondary element into said holding means to thereby activate said sensing means to emit electrical signals corresponding to said indicia on said secondary element.

3. A system according to claim 1 wherein said secondary representation deriving and storing means includes a plurality of signal channels, and sensing means displaceable relative to said selected secondary element for producing electrical signals corresponding to said identifying indicia in selected ones of said channels.

4. A system according to claim 1 including means associated with said posting means and said deriving and storing means for preventing posting of said primary data until said corresponding secondary representation has been derived and stored.

5. A data processing system comprising means for posting on a selected secondary element, a primary data representation derived from a selected primary element, means associated with said posting means for deriving and storing a secondary representation corresponding to said selected secondary element, means for holding said selected primary element, and means communicating with said holding means for transferring an indication of said stored secondary representation to said selected primary element in association with said posting of said primary data.

6. A system according to claim 5 including means associated with said holding and said posting means for automatically discharging said selected primary element from said holding means subsequent to said primary data posting, and means coupled to said discharging and said posting means for inhibiting the respective operations thereof until said primary element is positioned in said holding means to receive said indication in a given region thereof.

7. A system according to claim 5 wherein said deriving and storing means includes means for selectively producing intelligence indications, and means for setting said indication producing means in accordance with said derived secondary representation, and wherein said indication transferring means includes means coupled to said indication producing means, said primary element holding means, and said posting means, for transferring said set indication from said producing means to said selected primary element if and only if said primary data is posted after the deposition of said primary element in said holding means.

8. A system according to claim 7 including means for resetting said indication producing means to a predetermined reference condition in association with the selection of said secondary element.

9. A system according to claim 7 including means for enabling said setting means in association with the selection of said secondary element and means for disabling said setting means after the setting up of said derived secondary representation in said producing means.

10. A system according to claim 5 including means coupled to said holding means for blocking the completion of said primary data posting operation until said selected primary element is situated in a predetermined position relative to said holding means, and means coupled to said posting and said indication transferring means for enabling said indication transferring means in association with said primary data posting.

11. A system according to claim 10 wherein said blocking means includes means for sensing the position of said selected primary element in relation to said holding means, and said enabling means includes means for transferring an enabling signal in association with the operation of said posting means and in response to a predetermined output condition of said position sensing means.

12. A system according to claim 10 including an enclosed receptacle and means coupled to said indication transferring means for discharging said selected primary element into said receptacle in association with the operation of said indication transferring means.

13. A data processing system comprising respective means for holding primary and secondary elements, said secondary elements having identifying indicia thereon, means for posting on a selected secondary element primary data derived from a selected primary element, means coupled to said secondary element holding means for producing a predetermined relative movement between said selected secondary element and said posting means in association with the insertion of said selected secondary element into said secondary element holding means, a plurality of signal channels, means operative in association with the operation of said relative movement producing means for producing a variably timed signal in each said channel, each said signal representing a corresponding intelligence unit included in said indicia on said secondary element, a plurality of variable indication producing elements individually corresponding to said signal channels, means coupled to said secondary element holding means for operating said indication producing elements to predetermined reference conditions in association with the insertion of said selected secondary element into said secondary element holding means, a corresponding plurality of setting elements variably coupled to said indication producing elements for discretely varying said indication producing elements in synchronism with corresponding increments of said predetermined movement of said secondary element, means for effecting coupling between said corresponding setting and indication producing elements in association with the insertion of said selected secondary element into said secondary element holding means, means coupled to each said channel for disjoining said corresponding setting and indication producing elements in response to said variably timed signals in said channel, means mounted on said posting means for discharging said secondary element into said posting means from said secondary element holding means at the conclusion of said predetermined relative movement of said secondary element, transfer means for operating said indication producing elements relative to a primary element in said primary element holding means for transferring a representation of said set indication thereto, means coupled to said primary element holding means for preventing operation of said posting means until said selected primary element is properly deposited in said primary element holding means, means coupled to said posting means for operating said transfer means in association with the operation of said posting means, a storage receptacle, and means coupled to said posting means for discharging said selected primary element into said receptacle at a predetermined time following operation of said transfer means.

14. A data processing system comprising respective means for holding primary and secondary elements, said secondary elements having identifying indicia thereon, means for posting on a selected secondary element primary data derived from a selected primary element, a plurality of signal channels, means coupled to said secondary element holding means for varying electrical conditions in selected ones of said channels in association with the deposition of said selected secondary element in said secondary element holding means and in accordance with said indicia on said secondary element, means for scanning said channels in predetermined groups, each said group including a different one of said selected channels, a plurality of variable indication producing elements corresponding to said plurality of groups of channels, setting means variably coupled to said indication producing elements for incrementally varying the indications thereof, means coupled to said secondary element holding means, said scanning means, and said setting means, for synchronously operating said setting and scanning means in association with the deposition of said selected secondary element in said holding means, means for disabling said last-mentioned means when said indication setting means are all in conditions correlated to said indicia on said secondary element, means for disjoining said setting means from each said indication producing element when said scanning means is coupled to said selected channel in said corresponding group of channels, means for retaining said secondary element in said secondary element holding means until said indication setting means are all in conditions correlated to said indicia on said secondary element, transfer means for operating said indication producing elements relative to said primary element holding means for transferring a representation of said set indications to a primary element held therein, means associated with said posting and primary element holding means for preventing operation of said posting means until said selected primary element is suitably deposited in said primary element holding means, means coupled to said posting means for operating said transfer means in association with operations of said posting means, a storage receptacle, and means associated with said transfer means for discharging said selected primary element into said receptacle at a predetermined time following operation of said transfer means.

15. An account number verifying system for use in association with an accounting machine—of the type containing adding and printing mechanisms, and a movable carriage for transversely displacing a ledger sheet in relation to said printing mechanism, said carriage including rollers for holding and vertically displacing said ledger sheet relative to said printing mechanism—comprising a first holding fixture mounted on said movable carriage of said accounting machine and adapted to releasably engage a ledger sheet inserted therein, means displaceable relative to said first holding fixture for producing electrical signals representative of account number markings on a ledger sheet held in said first holding fixture during a predetermined displacement of said carriage, said fixture including means for automatically releasing said ledger sheet for vertical transport by said rollers following said predetermined carriage displacement, means coupled to said signal producing means for storing a representation of said account number signals, a second holding fixture for holding a document bearing data which is to be transferred to said ledger sheet released from said first holding fixture and held by said carriage rollers, and means disposed adjacent said second holding fixture and coupled to said storing means for transferring to said document an indication corresponding to said stored representation of said account number signals in association with a transfer of said data to said ledger sheet via said accounting machine.

16. An account number verifying system for use in association with an accounting machine—of the type containing adding and printing mechanisms, and a movable carriage for transversely displacing a ledger sheet in relation to said printing mechanism, said carriage including rollers for holding and vertically displacing said ledger sheet relative to said mechanism—comprising a first holding fixture adapted to releasably engage a ledger sheet inserted therein, means displaceable relative to said first holding fixture for producing electrical signals representative of account number markings on a ledger sheet held in said first holding fixture during a predetermined displacement of said carriage, said fixture including means for automatically releasing said ledger sheet for vertical transport by said rollers following said predetermined carriage displacement, means coupled to said signal producing means for storing a representation of said account number signals, a second holding fixture for holding a document bearing data which is to be transferred to said ledger sheet released from said first holding fixture and held by said carriage rollers, and means disposed adjacent said second holding fixture and coupled to said storing means for transferring to said document an indication corresponding to said stored representation of said account number signals in association with a transfer of said data to said ledger sheet via said accounting machine.

References Cited by the Examiner

UNITED STATES PATENTS

| | | | |
|---|---|---|---|
| 2,414,643 | 1/47 | Gollwitzer | 235—61.9 |
| 2,947,475 | 8/60 | Rauch et al. | 235—61.6 |
| 2,972,444 | 2/61 | Phelan | 235—61.9 |
| 3,102,950 | 9/63 | Arnold et al. | 235—61.7 |

MALCOLM A. MORRISON, *Primary Examiner.*

WALTER W. BURNS, JR., *Examiner.*